(12) United States Patent
Fukuda

(10) Patent No.: US 7,412,060 B2
(45) Date of Patent: Aug. 12, 2008

(54) CONTENTS DATA TRANSMISSION/RECEPTION SYSTEM, CONTENTS DATA TRANSMITTER, CONTENTS DATA RECEIVER AND CONTENTS DATA TRANSMISSION/RECEPTION METHOD

(75) Inventor: Keiichi Fukuda, Fukushima (JP)

(73) Assignee: D&M Holdings Inc., Kawasaki-shi, Kanagawa (JP)

( * ) Notice: Subject to any disclaimer, the term of this patent is extended or adjusted under 35 U.S.C. 154(b) by 746 days.

(21) Appl. No.: 10/800,688

(22) Filed: Mar. 16, 2004

(65) Prior Publication Data

US 2004/0190723 A1 Sep. 30, 2004

Related U.S. Application Data

(63) Continuation-in-part of application No. 10/400,491, filed on Mar. 28, 2003, now Pat. No. 7,213,156.

(30) Foreign Application Priority Data

Sep. 5, 2003 (JP) .............................. 2003-313852

(51) Int. Cl.
 *H04L 9/00* (2006.01)
(52) U.S. Cl. ..................... 380/277; 713/189; 713/193
(58) Field of Classification Search .................. 380/277
 See application file for complete search history.

(56) References Cited

U.S. PATENT DOCUMENTS

| 6,697,945 | B2 * | 2/2004 | Ishiguro et al. | ............. | 713/171 |
| 2002/0083319 | A1 * | 6/2002 | Ishiguro et al. | ............. | 713/168 |

FOREIGN PATENT DOCUMENTS

| EP | 0 682 425 | | 11/1995 |
| EP | 0 874 300 | A2 | 10/1998 |
| EP | 0 977 107 | | 2/2000 |
| EP | 1 089 488 | | 4/2001 |
| EP | 0 161 040 | A2 | 12/2001 |

OTHER PUBLICATIONS

Hitachi, Ltd. Et al., "5C Digital Transmission Content Protection White Paper—Revision 1.0", DTCP Group, Jul. 14, 1998, XP002134182.

* cited by examiner

*Primary Examiner*—Kimbiz Zand
*Assistant Examiner*—Yonas Bayou
(74) *Attorney, Agent, or Firm*—Dickstein Shapiro LLP

(57) ABSTRACT

In a contents data transmission/reception system, a contents data transmitter generates a plurality of key information, encrypts contents data by using one of the key information, transmits the key information through a plurality of signal routes to a contents data receiver, and then, transmits the encrypted contents data used by the key information through the signal routes to the contents data receiver. The contents data receiver receives the key information and the encrypted contents data transmitted from the contents data transmitter through the signal routes, and decrypts the encrypted contents data by using the key information.

19 Claims, 10 Drawing Sheets

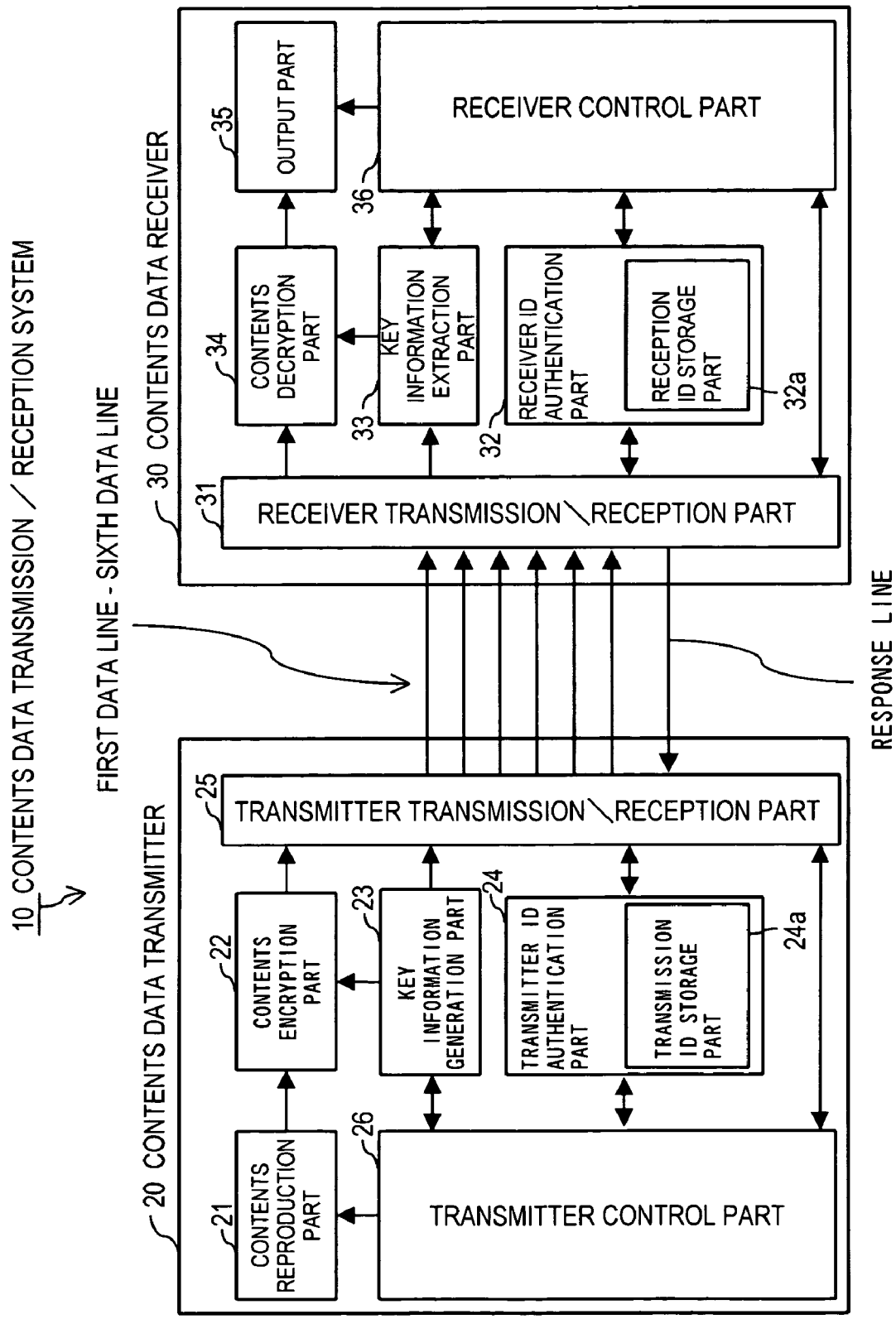

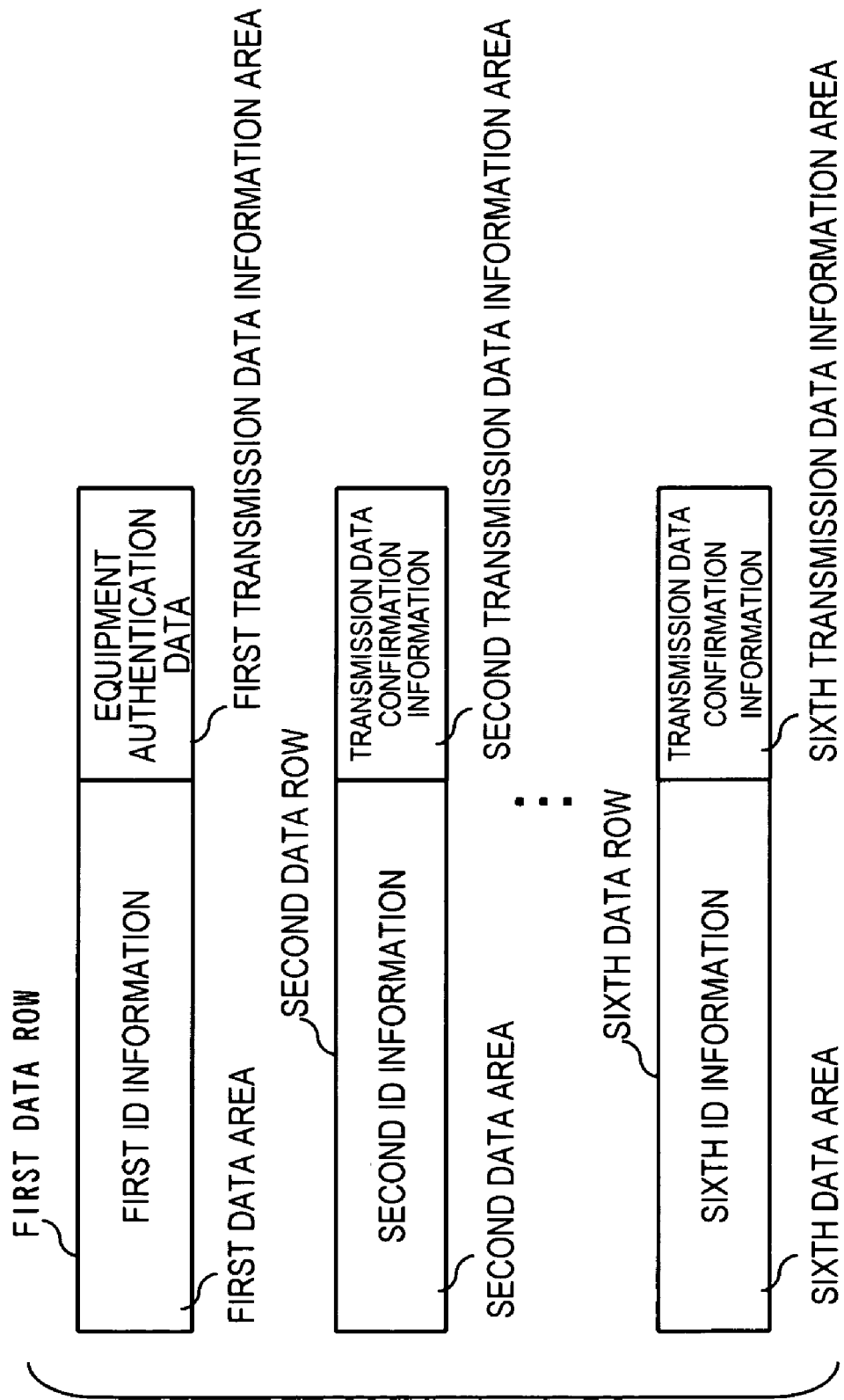

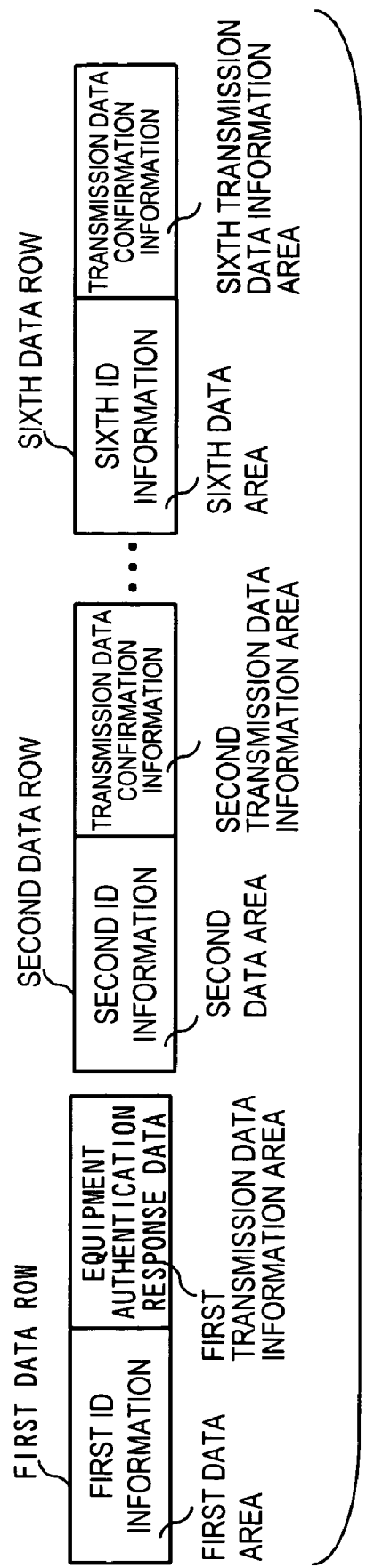

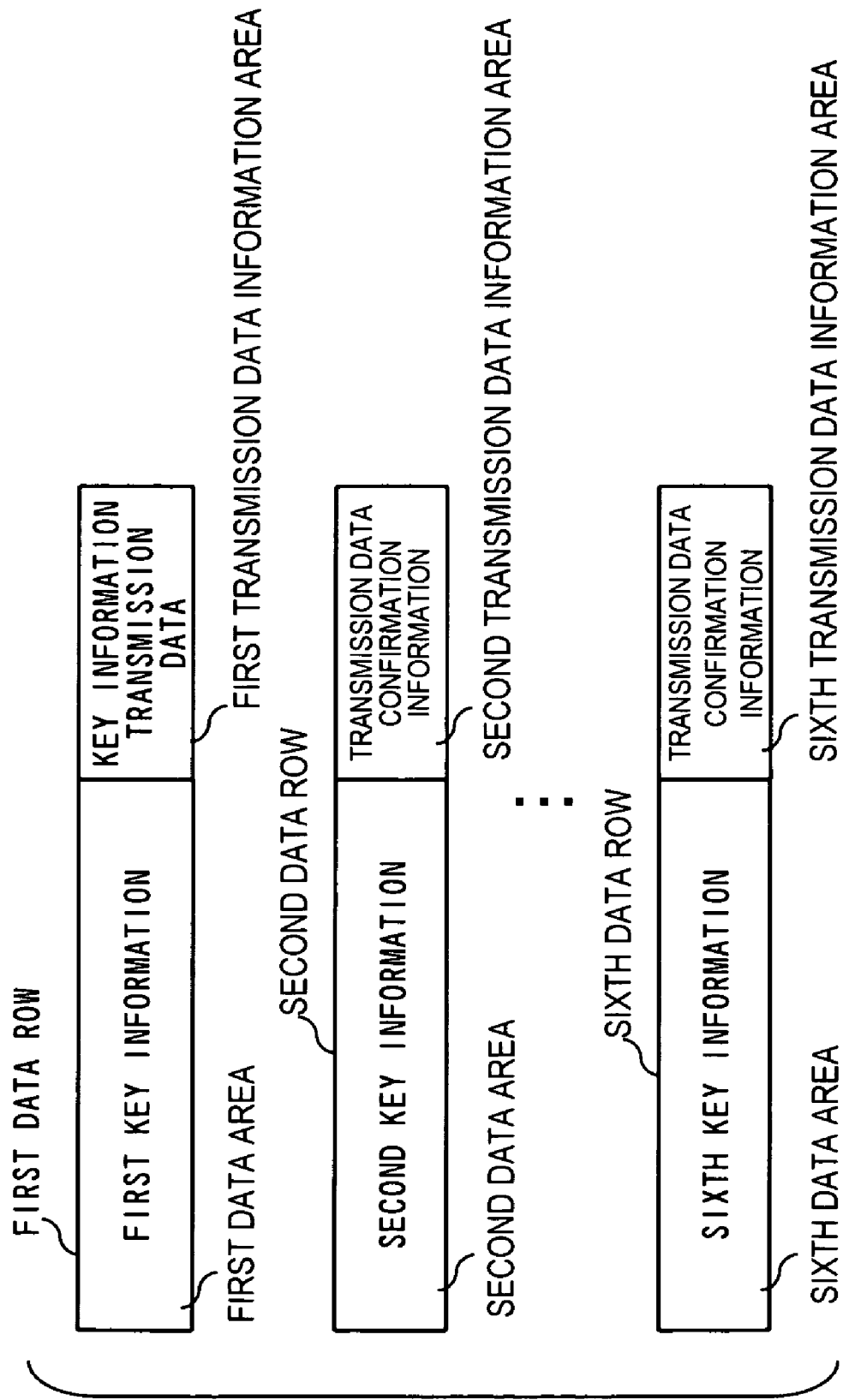

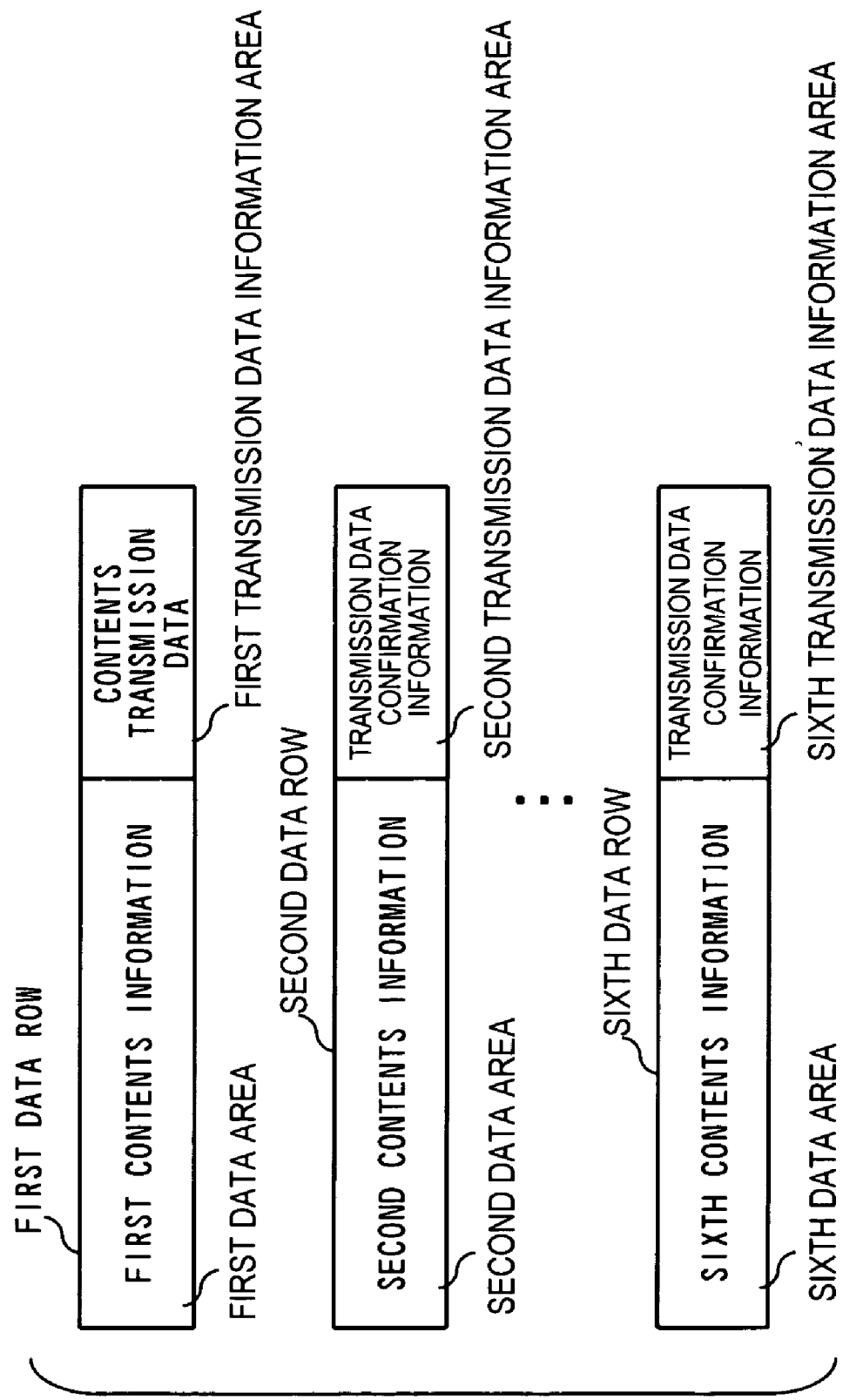

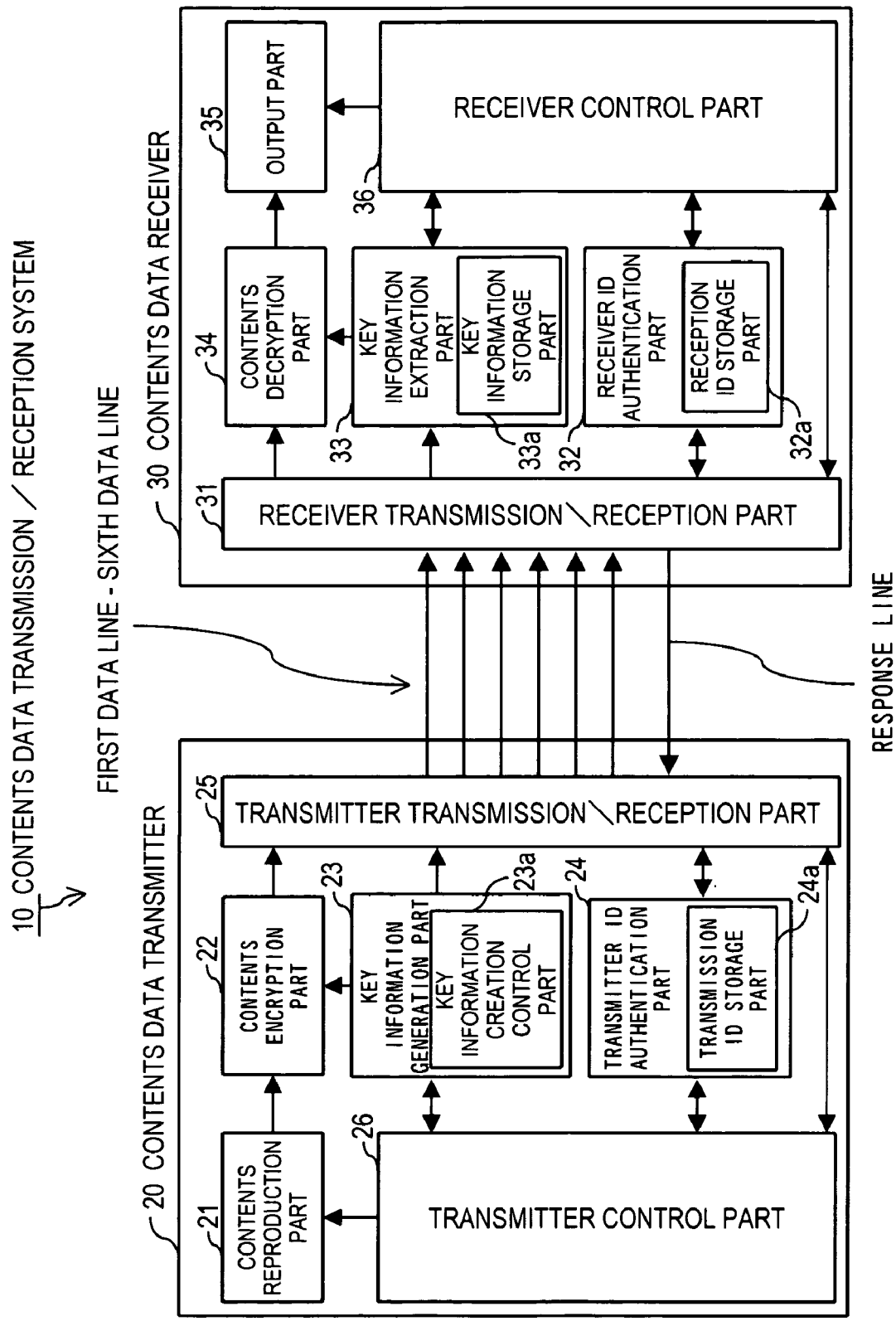

CONTENTS DATA TRANSMISSION/RECEPTION SYSTEM, CONTENTS DATA TRANSMITTER, CONTENTS DATA RECEIVER AND CONTENTS DATA TRANSMISSION/RECEPTION METHOD

CROSS REFERENCE TO RELATED APPLICATIONS

The present application is a continuation-in-part of U.S. application Ser. No. 10/400,491 filed on Mar. 28, 2003 now U.S. Pat. No. 7,213,156, the disclosure of which is incorporated by reference herein.

BACKGROUND OF THE INVENTION

The present invention relates to a contents data transmission/reception system in which contents data, such as audio data and video data, is transmitted and received between plural apparatuses, a contents data transmitter, a contents data receiver, and a contents data transmission/reception method.

There is a digital versatile disc (DVD) as a recording medium which can record massive data. The DVD includes a DVD-VIDEO in which video data and audio data are recorded, and a DVD-AUDIO in which high quality audio data is recorded. An optical disc reproducing apparatus for reproducing these DVDs reproduces digital data recorded in the DVD, and can analog-output audio data as an analog signal or digital-output it as two-channel digital data.

There is a case where audio data of plural channels (multi-channel) such as a left(L)-channel, a right(R)-channel, a surround left(SL)-channel, a surround right (SR)-channel, and a center(C)-channel are recorded in the DVD. In the case where the multi-channel audio data recorded in the DVD is digital-outputted, the optical disc reproducing apparatus down-mixes the multi-channel audio data into 2-ch digital data, and outputs the down-mixed data as digital data in compliance with a data format of IEC (International Electrotechnical Commission) 958.

There is a case where the sound quality of the audio data analog-outputted from the optical disc reproducing apparatus is degraded since noise is superposed during signal transmission. As compared with analog output audio data, the sound quality of the audio data digital-outputted from the optical disc reproducing apparatus is not degraded by the superposition of noise during signal transmission.

When the audio data is digital-outputted, the optical disc reproduction apparatus converts the multi-channel audio data recorded in the DVD into the 2-channel audio data and outputs it. An amplifier (for example, AV (Audio Visual) amplifier) for amplifying the audio data outputted from the optical disc reproducing apparatus and outputting it to a speaker or the like receives the 2-channel audio data digital-outputted from the optical disc reproducing apparatus, converts it into multi-channel audio data and outputs it.

In the amplifier, the processing of converting the input 2-channel audio data into the multi-channel audio data is performed by conversion means mounted in the amplifier. In this arithmetic processing, since parameters used for its processing method and calculation vary according to respective manufacturers of the conversion means (for example, DSP (Digital Signal Processor)), the inputted 2-channel audio data can not be faithfully converted into the audio data of the original multi-channel recorded in the DVD. In other words, the 2-channel audio data is converted into multi-channel audio data, so that the audio data the sound quality of which is more degraded than the multi-channel audio data recorded in the optical disc is outputted from the amplifier.

Thus, there has been raised a demand for faithfully reproducing high sound quality audio data recorded in an optical disc in such a manner that the foregoing conversion processing is not performed to the multi-channel digital data, the audio data reproduced by the optical disc reproducing apparatus is digital-outputted as the multi-channel audio data, and the amplifier as the receiving side of the digital data converts the multi-channel digital audio data into an analog audio signal and outputs it.

However, in the case where the multi-channel digital audio data is outputted from the optical disc reproducing apparatus, it becomes possible to copy the digital audio data on a recording medium. In order to prevent the illegal copy of the digital audio data, it is conceivable to use a technique to transmit and receive encrypted contents data between two apparatuses, like a data transmission system as disclosed in the Laid-Open Japanese Patent application publication No. 11-289323 (patent publication 1) or a contents distribution system as disclosed in the Laid-Open Japanese Patent application publication No. 2000-242604 (patent publication 2)

In the data transmission system disclosed in the patent publication 1, a client computer generates an encryption key and a decryption key, sends the encryption key and an image data transfer request to a server computer, the server computer encrypts the image data by the encryption key, transmits the encrypted image data to the client computer, and the client computer uses the held decryption key to decrypt the encrypted image data.

In the contents distribution system disclosed in the patent publication 2, when a user ID, an authentication ID and a download request for contents data are transmitted from a client to a server, in the case where the user ID and the contents data are registered in a table of the server, and the authentication ID held by the server is identical to the authentication ID transmitted from the client, the server generates a decryption key for decrypting the encrypted contents, and transmits the encrypted contents data and the decryption key to the client. The client uses the decryption key transmitted from the server to decrypt the encrypted contents data, and reproduces the contents data.

In the data transmission system disclosed in the patent publication 1 or the contents distribution system disclosed in the patent publication 2, these systems encrypt the contents data by using one key information, and transmit the encrypted contents data and the encryption breaking information (key information) for decrypting the encryption of the encrypted contents data by using a single signal line for connecting the apparatuses.

In the system as described above, since the contents data is encrypted only by using one key information, and encryption decrypting information (key information) is transmitted as one of information through the single signal line from the contents data transmitter to the contents data receiver, there is a problem that the original high quality contents data can be obtained by extracting the encryption breaking information from the data transmitted between the two apparatuses and decrypting the encrypted contents data by using the encryption breaking information.

SUMMARY

The present invention has an object to provide a contents data transmission/reception system, a contents data transmitter, a contents data receiver, and a contents data transmission/reception method, in which it is difficult to extract encryption breaking information for decrypting encrypted contents data transmitted and received between plural apparatuses and easily decrypt the encrypted contents data.

According to a first aspect of the invention, there is provided a contents data transmission/reception system comprising a contents data transmitter transmitting contents data and a contents data receiver receiving the contents data, wherein the contents data transmitter includes a key information selection part which generates a plurality of key information for encryption and selects a key information among a plurality of the key information, a contents encryption part which encrypts an inputted contents data by using the key information selected by the key information selection part, and a transmitter transmission/reception part which transmits a plurality of the key information, and then the encrypted contents data and a selection information regarding the key information used in the encryption of the contents data to be transmitted, and the contents data receiver includes a receiver transmission/reception part which receives a plurality of the key information, the encrypted contents data and the selection information from the contents data transmitter through a plurality of signal routes, a key information storage part which stores a plurality of the received key information, a key information extraction part which extracts the key information used in the encryption of the contents data based on the selection information among a plurality of the key information stored in the key information storage part, a contents decryption part which decrypts the encrypted contents data by using the key information extracted by the key information extraction part, and an output part which outputs the contents data decrypted by the contents decryption part.

In the first aspect of the invention above, the contents data transmitter may further include a reproducing part which reproduces a contents data to input to the contents encryption part.

In the first aspect of the invention above, the contents data transmitter may include a transmission ID storage part which stores a plurality of transmission ID information assigned to respective contents data receivers, the contents data receiver may include a reception ID storage part which stores a receiver ID information assigned to the contents data receiver, the contents data transmitter may select one of the transmission ID information stored in the transmission ID storage part to transmit to the contents data receiver, the contents data receiver may transmit, when the received transmission ID information is coincident with the receiver ID information stored in the reception ID storage, a confirmation information indicating the coincidence to the contents data transmitter, and the contents data transmitter may transmit, when received the confirmation information from the contents data receiver, the key information, the encrypted contents data and the selection information to the contents data receiver.

In the first aspect of the invention above, the transmission ID information may be transmitted through a plurality of signal route.

In the first aspect of the invention above, contents data may be inputted continuously, and the key information selection part may select one among a plurality of the key information at a predetermined time interval.

In the first aspect of the invention above, the contents data transmitter may transmit data divided in a plurality of data rows respectively through a plurality of the signal routes to the contents data receiver, and the data row may include data areas for the encrypted contents data and the selection information.

According to a second aspect of the invention, there is provided a contents data transmitter transmitting contents data, comprising a key information selection part which generates a plurality of key information for encryption and selects a key information among a plurality of the key information, a contents encryption part which encrypts an inputted contents data by using the key information selected by the key information selection part, and a transmitter transmission/reception part which transmits a plurality of the key information, and then the encrypted contents data and a selection information regarding the key information used in the encryption of the contents data to be transmitted, through a plurality of signal routes to a contents data receiver in that the encrypted contents data is encrypted by using a corresponding key information extracted among a plurality of the received key information based on the received selection information.

In the second aspect of the invention above, the contents data transmitter may further comprise a reproducing part which reproduces a contents data to input to the contents encryption part.

In the second aspect of the invention above, the contents data transmitter may include a transmission ID storage part which stores a plurality of transmission ID information assigned to respective contents data receivers, and the contents data transmitter may select one of the transmission ID information stored in the transmission ID storage part to transmit to the contents data receiver, when the transmitted transmission ID information is coincident with the receiver ID information assigned to the contents data receiver and a confirmation information indicating the coincidence to the contents data transmitter is received from the contents data receiver, the contents data transmitter transmits the key information, the encrypted contents data and the selection information to the contents data receiver.

In the second aspect of the invention above, the transmission ID information may be transmitted through a plurality of signal route.

In the second aspect of the invention above, contents data may be inputted continuously, and the key information selection part may select one among a plurality of the key information at a predetermined time interval.

In the second aspect of the invention above the contents data transmitter may transmit data divided in a plurality of data rows respectively through a plurality of the signal routes to the contents data receiver, and the data row includes data areas for the encrypted contents data and the selection information.

According to a third aspect of the invention, there is provided a contents data receiver receiving contents data from a contents data transmitter, comprising a receiver transmission/reception part which receives a plurality of the key information for encryption, a contents data encrypted by using a key information selected from a plurality of the key information and a selection information regarding the key information used in the encryption of the contents data from the contents data transmitter through a plurality of signal routes, a key information storage part which stores a plurality of the received key information, a key information extraction part which extracts the key information used in the encryption of the contents data based on the selection information among a plurality of the key information stored in the key information storage part, a contents decryption part which decrypts the encrypted contents data by using the key information extracted by the key information extraction part, and an output part which outputs the contents data decrypted by the contents decryption part.

In the third aspect of the invention above, the contents data receiver may include a reception ID storage part which stores a receiver ID information assigned to the contents data receiver, the contents data receiver may receive one of transmission ID information assigned to respective contents data receivers from the contents data transmitter, the contents data receiver may transmit, when the received transmission ID information is coincident with the receiver ID information stored in the reception ID storage, a confirmation information indicating the coincidence to the contents data transmitter, and the contents data receiver may receive from the contents data transmitter received the confirmation information from the contents data receiver, the key information, the encrypted contents data and the selection information to the contents data receiver.

According to a fourth aspect of the invention, there is provided a contents data transmission/reception method for transmitting and receiving contents data between a contents data transmitter and a contents data receiver, including generating a plurality of key information for encryption in the contents data transmitter and transmitting a plurality of the key information from the contents data transmitter to the contents data receiver, selecting one key information from a plurality of the generated key information in the contents data transmitter, encrypting a contents data by using the selected key information in the contents data transmitter, transmitting the encrypted contents data and a selection information regarding the selected key information from the contents data transmitter to the contents data receiver through a plurality of signal routes, extracting the key information used in the encryption of the contents data from a plurality of the key information in the contents data receiver, decrypting the encrypted contents data in the contents data receiver, and outputting the decrypted contents data from the contents data receiver.

In the fourth aspect of the invention above, the contents data transmission/reception method may further include reproducing a contents data to be encrypted.

In the fourth aspect of the invention above, the contents data transmission/reception method may further include transmitting one of transmission ID information assigned to respective contents data receiver from the contents data transmitter to the contents data receiver through a plurality of signal routes, and transmitting, when the transmission ID information is coincident with a receiver ID information assigned to the contents data receiver, a confirmation information indicating the coincidence from the contents data receiver to the contents data transmitter.

In the fourth aspect of the invention above, the contents data transmission/reception method may further include transmitting a reception information indicating that the contents data receiver receives a plurality of the key information from the contents data receiver to the contents data transmitter through a plurality of signal routes, and when the reception information is received by the contents data transmitter, the one key information from a plurality of the key information is selected in the contents data transmitter.

In the fourth aspect of the invention above, the contents data may be inputted continuously, and one key information for encryption may be selected from a plurality of the key information at a predetermined time interval.

BRIEF DESCRIPTION OF THE DRAWINGS

FIG. 1 is a schematic structural view showing an embodiment of a contents data transmission/reception system of the invention;

FIGS. 3A and 3B are views showing formats of equipment authentication data and equipment authentication response data in the contents data transmission/reception system of the embodiment;

FIGS. 4A and 4B are views showing formats of key information transmission data and key information reception data in the contents data transmission/reception system of the embodiment;

FIGS. 5A and 5B are views showing formats of contents transmission data and contents reception data in the contents data transmission/reception system of the embodiment.

FIG. 7 is a schematic structural view showing another embodiment of a contents data transmission/reception system of the invention.

DESCRIPTION OF PREFERRED EMBODIMENTS

Figure 2A:
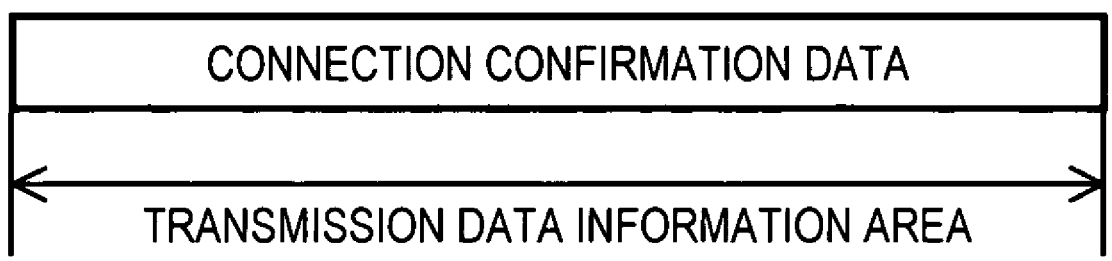
FIGS. 2A and 2B are views showing formats of connection confirmation data and connection confirmation response data in the contents data transmission/reception system of the embodiment.

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

FIG. 1 is a schematic structural view showing an embodiment of a contents data transmission/reception system of the invention.

In FIG. 1, a contents data transmission/reception system 10 includes a contents data transmitter 20 and a contents data receiver 30. The contents data transmission/reception system 10 is such a system that the contents data transmitter 20 uses key information to encrypt contents data, transmits the key information and the encrypted contents data (encryption contents data) to the contents data receiver 30, the contents data receiver 30 receives the key information and the encrypted contents data transmitted from the contents data transmitter 20, and breaks the encryption of the encrypted contents data by using the key information.

The contents data transmitter 20 is a reproducing apparatus, such as a DVD-Video player, for reproducing and outputting video data and audio data recorded on a recording medium, for example, a digital versatile disc (DVD). In this embodiment, although the description will be given on the premise that the contents data transmitter 20 is the reproducing apparatus, it may be an apparatus for receiving contents data transmitted through a network and outputting the received contents data.

The contents data receiver 30 is an amplifier, such as AV (Audio Visual) amplifier, which receives video data and audio data outputted from, for example, the DVD-Video player, converts the video data into an analog video signal to output it to a display apparatus such as a monitor, and converts the audio data into an analog audio signal to amplify and to output it to a speaker. In this embodiment, although the description will be given on the premise that the contents data receiver 30 is the amplifier, it may be an apparatus which receives the contents data transmitted from the contents data transmitter 20 and edits the contents data to output it.

The contents data transmitter 20 and the contents data receiver 30 are connected through a video data transmission path for transmitting the video data and an audio data transmission path for transmitting the audio data. In this embodiment, only the audio data transmission path will be described.

In this embodiment, it is assumed that the audio transmission path between the contents data transmitter 20 and the contents data receiver 30 includes seven signal lines for the connection. Six signal lines of the seven signal lines are a first data line to a sixth data line for transmitting data (after-mentioned connection confirmation data, equipment authentication data, key information transmission data and contents transmission data) from the contents data transmitter 20 to the contents data receiver 30, and the remaining one signal line of the seven signal lines is a response line for transmitting data (after-mentioned connection confirmation response data, equipment authentication response data, key information reception data and contents reception data) from the contents data receiver 30 to the contents data transmitter 20. The audio data transmission path as stated above can also use a format in compliance with a digital audio interface as data transmitting through plural signal lines. Further, in this embodiment, although it is described that data transmission between the contents data transmitter and the contents data receiver is performed through signal lines, the data transmission can be performed through other routes such as wireless lines.

The contents data transmitter 20 includes a contents reproduction part 21, a contents encryption part 22, a key information generation part 23, a transmitter ID authentication part 24, a transmitter transmission/reception part 25, and a transmitter control part 26.

The contents reproduction part 21 reproduces contents data (audio data) recorded on a recording medium and outputs it to the contents encryption part 22.

The contents encryption part 22 uses key information generated by the key information generation part 23 to encrypt the contents data reproduced by the contents reproduction part 21. An encryption method in the contents encryption part 22 is not particularly limited, and any method may be used.

The key information generation part 23 generates the key information for encrypting the contents data, and outputs it to the contents encryption part 22. The key information is information composed of, for example, a data row of plural bits, and a generation method of the key information is not particularly limited and any method may be used.

Besides, in the case where the generated key information is transmitted to the contents data receiver 30, the key information generation part 23 encrypts the generated key information and outputs it to the transmitter transmission/reception part 25.

The encryption of the key information in the key information generation part 23 is performed by a previously determined method. An after-mentioned key information extraction part 33 of the contents data receiver 30 has a decryption processing function for breaking the encryption of the key information performed by the key information generation part 23. The key information encrypted by the key information generation part 23 can be decrypted by the after-mentioned key information extraction part 33. In this embodiment, although the key information generation part 23 encrypts the key information and transmits it to the contents data receiver 30, the key information may be transmitted to the contents data receiver 30 without being encrypted.

The transmitter ID authentication part 24 includes a transmission ID storage part 24a for storing plural of receiver ID information individually assigned to respective contents data receivers. The transmitter ID authentication part 24 selects one of the plural of receiver ID information stored in the transmission ID storage part 24a at the time of after-mentioned equipment authentication, encrypts the reception ID information and outputs it to the transmitter transmission/reception part 25.

An encryption method of the receiver ID information in the transmitter ID authentication part 24 is not particularly limited and any method may be used. An after-mentioned receiver ID authentication part 32 of the contents data receiver 30 has a decryption processing function for breaking the encryption of the receiver ID information performed by the transmitter ID authentication part 24. The receiver ID information encrypted by the transmitter ID authentication part 24 can be decrypted by the after-mentioned receiver ID authentication part 32. In this embodiment, although the transmitter ID authentication part 24 encrypts the receiver ID information and transmits it to the contents data receiver 30, the receiver ID information may be transmitted to the contents data receiver 30 without being encrypted.

Besides, the transmitter ID authentication part 24 compares receiver ID information, which is transmitted from the contents data receiver 30 and is received by the transmitter transmission/reception part 25, with the plural of receiver ID information stored in the transmission ID storage part 24a, and notifies the transmitter control part 26 of a compared result.

The transmitter transmission/reception part 25 performs, by the control of the transmitter control part 26, transmission/reception of data (connection confirmation data and connection confirmation response data) for performing connection confirmation between the contents data transmitter 20 and the contents data receiver 30, transmission/reception of data (equipment authentication data and equipment authentication response data) for performing equipment authentication, transmission/reception of data (key information transmission data and key information reception data) relating to the key information for breaking the encryption of the encrypted contents data, and transmission/reception of data (contents transmission data and contents reception data) relating to transmission/reception of the encrypted contents data.

Although described later, each of the equipment authentication data, the key information transmission data and the contents transmission data is composed of plural data rows. The transmitter transmission/reception part 25 performs, by the control of the transmitter control part 26, a processing to divide each of the encrypted key information outputted from the key information generation part 23, the encrypted receiver ID information outputted from the transmitter ID authentication part 24, and the encrypted contents data outputted from the contents encryption part 22 and to store the divided data respectively into the plural data rows including in the equipment authentication data, the key information transmission data, and the contents transmission data, and transmits the respective data to the contents data receiver 30.

The transmitter control part 26 comprehensively controls the contents data transmitter 20. When an instruction to start reproduction is issued from an operation part (not shown), the transmitter control part 26 performs the control of the reproduction of the contents data recorded on a recording medium in the contents reproduction part 21.

When the connection confirmation and equipment authentication between the contents data transmitter 20 and the contents data receiver 30 is ended, the transmitter control part 26 performs a control to generate the key information for encrypting the contents data in the key information generation part 23. Besides, the transmitter control part 26 performs a control to encrypt the generated key information.

The transmitter control part 26 performs a control to encrypt the contents data reproduced by the contents reproduction part 21 by using the key information generated by the key information generation part 23 in the contents encryption part 22.

The transmitter control part 26 controls transmission/reception of the connection confirmation data and the connection confirmation response data, transmission/reception of the equipment authentication data and the equipment authentication response data, transmission/reception of the key information transmission data and the key information reception data, and transmission/reception of the contents transmission data and the contents reception data in the transmitter transmission/reception part 25.

Before transmitting the encrypted contents data encrypted by the contents encryption part 22 to the contents data receiver 30, the transmitter control part 26 performs a control to transmit the connection confirmation data for confirming the connection between the contents data transmitter 20 and the contents data receiver 30 through one or plural data lines. When receiving the connection confirmation response data transmitted from the contents data receiver 30 through the response line, the transmitter control part 26 judges that the contents data transmitter 20 is connected to the contents data receiver 30.

When the connection confirmation between the contents data transmitter 20 and the contents data receiver 30 is ended, the transmitter control part 26 performs a control to extract one of receiver ID information corresponding to the contents data receiver 20 from the plural of receiver ID information stored in the transmission ID storage part 24*a* of the transmitter ID authentication part 24, to divide its encrypted receiver ID information, to store the divided data respectively into the equipment authentication data composed of plural data rows, and to transmit the equipment authentication data from the transmitter transmission/reception part 25 through the first data line to the sixth data line to the contents data receiver 30.

As a result the transmitter ID authentication part 24 compares the receiver ID information stored in the equipment authentication response data transmitted from the contents data receiver 30 through the response line with the receiver ID information stored in the transmission ID storage part 24*a*, in the case where both of these receiver ID information are coincident with each other, the transmitter control part 26 ends the equipment authentication.

In the case where the receiver ID information transmitted from the contents data receiver 30 is not coincident with the receiver ID information stored in the transmission ID storage part 24*a*, the transmitter control part 26 performs a control to cause the transmitter ID authentication part 24 to extract receiver ID information other than the already extracted receiver ID information from the plural of receiver ID information stored in the transmission ID storage part 24*a* and to encrypt it. Then, the transmitter control part 26 performs a control to divide the encrypted receiver ID information by the transmitter ID authentication part 24, to store the divided data respectively into the equipment authentication data composed of plural data rows, and to transmit it from the transmitter transmission/reception part 25 through the first data line to the sixth data line to the contents data receiver 30.

When the equipment authentication is ended, the transmitter control part 26 performs a control to divide the key information generated and encrypted by the key information generation part 23, to store the divided data respectively into the key information transmission data composed of plural data rows, and to transmit the key information transmission data from the transmitter transmission/reception part 25 through the first data line to the sixth data line to the contents data receiver 30.

The transmitter control part 26 confirms whether or not information stored in the key information reception data transmitted from the contents data receiver 30 through the response line is information indicating that the contents data receiver 30 acquires the key information. In the case where the information stored in the key information reception data is the information indicating that the key information is not acquired, the transmitter control part 26 performs a control to again transmit the key information transmission data from the transmitter transmission/reception part 25 through the first data line to the sixth data line to the contents data receiver 30.

When confirming that the contents data receiver 30 acquires the key information, the transmitter control part 26 performs a control to divide the encrypted data encrypted by the contents encryption part 22, to store the divided data respectively into the contents transmission data composed of plural data rows, and to transmit the contents transmission data from the transmitter transmission/reception part 25 through the first data line to the sixth data line to the contents data receiver 30.

The contents data receiver 30 includes a receiver transmission/reception part 31, the receiver ID authentication part 32, the key information extraction part 33, a contents decryption part 34, an output part 35 and a receiver control part 36.

The receiver transmission/reception part 31 performs transmission/reception of data (connection confirmation data and connection confirmation response data) for connection confirmation between the contents data transmitter 20 and the contents data receiver 30, transmission/reception of data (equipment authentication data and equipment authentication response data) for equipment authentication, transmission/reception of data (key information transmission data and key information reception data) relating to the key information for breaking the encryption of the encrypted contents data, and transmission/reception of data (contents transmission data and contents reception data) relating to transmission/reception of the encrypted contents data.

Although described later, each of the equipment authentication response data, the key information reception data, and the contents reception data is composed of plural data rows. By the control of the receiver control part 36, the receiver transmission/reception part 31 performs a processing to divide each of data indicating whether or not the key information outputted from the key information extraction part 33 is acquired, data indicating whether or not the receiver ID information outputted from the transmitter ID authentication part 24 coincides, and data indicating whether or not the contents data outputted from the contents encryption part 22 is acquired, and to store the divided data respectively into the plural data rows included in the equipment authentication response data, the key information reception data, and the contents reception data, and transmits the respective data to the contents data transmitter 20.

The receiver ID authentication part 32 includes a reception ID storage part 32*a* for storing receiver ID information individually assigned to the contents data receiver. At the time of equipment authentication, the receiver ID authentication part 32 compares the receiver ID information transmitted from the contents data transmitter 20 with the receiver ID information stored in the reception ID storage part 32*a*, and notifies the receiver control part 36 of a compared result.

In the case where the receiver ID information transmitted from the contents data transmitter 20 is coincident with the receiver ID information stored in the reception ID storage part 32a, by the control of the receiver control part 36, the receiver ID authentication part 32 encrypts the receiver ID information and outputs it to the receiver transmission/reception part 31. In the case where the receiver ID information transmitted from the contents data transmitter 20 is not coincident with the receiver ID information stored in the reception ID storage part 32a, the receiver ID authentication part 32 encrypts information (for example, data of "0") indicating the inconsistency of the receiver ID information and outputs it to the receiver transmission/reception part 31.

The key information extraction part 33 extracts the encrypted key information from information stored in the key information transmission data received by the receiver transmission/reception part 31, and decrypts the encrypted key information to acquire the key information. The key information extraction part 33 notifies the receiver control part 36 whether or not the key information could be acquired. In the case where the key information could be acquired by the control of the receiver control part 36, the key information extraction part 33 encrypts data of, for example, "1" as information indicating that the key information could be extracted and outputs it to the receiver transmission/reception part 31. In the case where the key information could not be acquired, the key information extraction part 33 encrypts data of, for example, "0" as information indicating that the key information could not be acquired and outputs it to the receiver transmission/reception part 31.

The contents decryption part 34 extracts the encrypted contents data from the contents transmission data received by the receiver transmission/reception part 31, and uses the key information extracted by the key information extraction part 33 to decrypt (break the encryption) the encrypted contents data.

The output part 35 digital-to-analog converts the contents data decrypted by the contents decryption part 34, and amplifies and outputs it to a speaker.

The receiver control part 36 comprehensively controls the contents data receiver 30. The receiver control part 36 controls transmission/reception of the connection confirmation data and the connection confirmation response data, transmission/reception of the equipment authentication data and the equipment authentication response data, transmission/reception of the key information transmission data and the key information reception data, and transmission/reception of the contents transmission data and the contents reception data in the receiver transmission/reception part 31.

When the receiver transmission/reception part 31 receives the connection confirmation data transmitted from the contents data transmitter 20, the receiver control part 36 performs a control to transmit the connection confirmation response data from the receiver transmission/reception part 31 through the response line to the contents data transmitter 20.

After the receiver ID authentication part 32 compares the receiver ID information of the equipment authentication data transmitted from the contents data transmitter 20 with the receiver ID information stored in the reception ID storage part 32a, the receiver control part 36 performs a control to transmit information indicating that both of these receiver ID information are coincident with each other or information indicating that both of these receiver ID information are not coincident with each other to the contents data transmitter 20.

In the case where both of these receiver ID information are coincident with each other, the receiver control part 36 performs a control to cause the receiver ID authentication part 32 to encrypt the receiver ID information, to divide the encrypted receiver ID information, to store the divided data respectively into the equipment authentication response data composed of plural data rows, and to transmit the equipment authentication response data from the receiver transmission/reception part 31 through the response line to the contents data transmitter 20.

In the case where both of these receiver ID information are not coincident with each other, the receiver control part 36 performs a control to encrypt information (for example, data of "0") indicating the inconsistency of the receiver ID information, to store the encrypted data respectively into the equipment authentication response data composed of plural data rows, and to transmit the equipment authentication response data from the receiver transmission/reception part 31 through the response line to the contents data transmitter 20.

The receiver control part 36 performs a control to confirm whether or not the key information extraction part 33 could acquire the key information from the key information transmission data transmitted from the contents data transmitter 20, and to transmit information indicating that the key information extraction part 33 could acquire the key information or the key information extraction part 33 could not acquire the key information to the contents data transmitter 20.

In the case where the key information extraction part 33 could acquire the key information, the receiver control part 36 performs a control to encrypt the information (for example, data of "1") indicating that the key information could be acquired, to divide the encrypted data, to store the divided data into the key information reception data composed of plural data rows, and to transmit the key information reception data from the receiver transmission/reception part 31 through the response line to the contents data transmitter 20.

In the case where the key information extraction part 33 could not acquire the key information, the receiver control part 36 performs a control to encrypt information (for example, data of "0") indicating that the key information could not be acquired, to divide the encrypted data, to store the divided data into the key information reception data composed of plural data rows, and to transmit the key information reception data from the receiver transmission/reception part 31 through the response line to the contents data transmitter 20.

When the key information extraction part 33 could acquire the key information and the contents transmission data is transmitted from the contents data transmitter 20, the receiver control part 36 performs a control to extract the encrypted contents data stored in the contents transmission data, and to decrypt the encrypted contents data in the contents decryption part 34 by using the key information.

The receiver control part 36 performs a control to confirm whether or not the contents decryption part 34 could acquire and decrypt the encrypted contents data from the contents transmission data transmitted from the contents data transmitter 20, and to transmit information indicating that the contents decryption part 34 could receive and decrypt the encrypted contents data or the contents decryption part 34 could not receive or could not decrypt the encrypted contents data to the contents data transmitter 20.

In the case where the contents decryption part 34 could receive and decrypt the encrypted contents data, the receiver control part 36 performs a control to encrypt information (for example, data of "1") indicating that the encrypted contents data could be received and decrypted, to divide the encrypted data, to store the divided data into the contents reception data composed of plural data rows, and to transmit the contents reception data from the receiver transmission/reception part 31 through the response line to the contents data transmitter 20.

In the case where the contents decryption part 34 could not receive or could not decrypt the encrypted contents data, the receiver control part 36 performs a control to encrypt information (for example, data of "0") indicating that the encrypted contents data could not be received or could not be encrypted, to divide the encrypted data, to store the divided data into the contents reception data composed of plural data rows, and to transmit the contents reception data from the receiver transmission/reception part 31 through the response line to the contents data transmitter 20.

The receiver control part 36 controls the output part 35 so that the contents data decrypted in the contents decryption part 34 is digital-to-analog converted, amplified and outputted.

Next, the data transmitted between the contents data transmitter 20 and the contents data receiver 30 will be described.

Figure 2B:
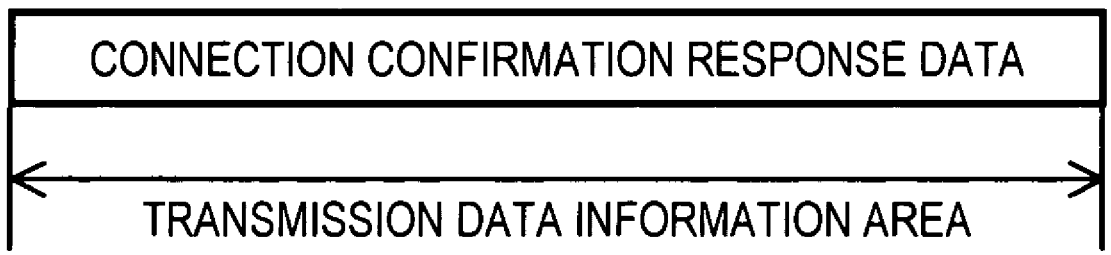

FIGS. 2A and 2B are views showing formats of the connection confirmation data and the connection confirmation response data in the contents data transmission/reception system 10 of this embodiment. FIG. 2A shows the connection confirmation data transmitted from the contents data transmitter 20 to the contents data receiver 30. FIG. 2B shows the connection confirmation response data transmitted from the contents data receiver 30 to the contents data transmitter 20.

As shown in FIG. 2A, the connection confirmation data includes a transmission data information area. Information indicating that the data is data (connection confirmation data) for connection confirmation is stored in the transmission data information area. The contents data transmitter 20 transmits the connection confirmation data shown in FIG. 2A through the plural data lines, respectively, to the contents data receiver 30. In this embodiment, although the connection confirmation data is transmitted through the plural data lines respectively, it may be transmitted through only one data line of the plural data lines.

As shown in FIG. 2B, the connection confirmation response data includes a transmission data information area. Information indicating that the data is response data (connection confirmation response data) to the connection confirmation data is stored in the transmission data information area. When the connection confirmation data shown in FIG. 2A is transmitted from the contents data transmitter 20 through the data lines, the contents data receiver 30 transmits the connection confirmation response data shown in FIG. 2B through the response line to the contents data transmitter 20.

In the case where the connection confirmation response data is not transmitted from the contents data receiver 30 after the connection confirmation data is transmitted to the contents data receiver 30, the contents data transmitter 20 judges that a connection with the contents data receiver 30 is not established, and again performs transmission after a definite time.

FIGS. 3A and 3B are views showing the equipment authentication data and the equipment authentication response data in the contents data transmission/reception system of this embodiment. FIG. 3A shows the equipment authentication data transmitted from the contents data transmitter to the contents data receiver. FIG. 3B shows the equipment authentication response data transmitted from the contents data receiver to the contents data transmitter.

As shown in FIG. 3A, the equipment authentication data is composed of a first data row, a second data row, . . . , a sixth data row. Each of the data rows includes a data area for storing divided information of the encrypted receiver ID information and a transmission data information area for storing information relating to the equipment authentication data.

Specifically, in the first data row, the first data area stores any one of information (first ID information) of six of information obtained by dividing the encrypted receiver ID information. The first transmission data information area stores information indicating that the data rows composed of the first data row to the sixth data row are equipment authentication data.

In the second data row to the sixth data row, each of the second data area to the sixth data area stores one of information (second ID information to the sixth ID information) of the six of information obtained by dividing the encrypted receiver ID information. The second transmission data information area to the sixth transmission data information area store the transmission data confirmation information indicating that the equipment authentication data is composed of the first data row to the sixth data row.

The transmission data confirmation information is, for example, a checksum value. The checksum value is a value indicating a result of addition of respective bit numbers in respective byte units after data is divided in one byte (8 bits) units. In this embodiment, it is assumed that the second data row stores a checksum value of data stored in the data areas of the first data row and the second data row, and a checksum value of data stored in the data areas of the first data row to the sixth data row, and each of the third data row to the sixth data row stores a checksum value of data stored in the data area of the respective data row and a checksum value of data stored in the data areas of the first data row to the sixth data row. The contents data receiver 30 confirms the checksum value of the transmission data confirmation information and confirms whether or not all the equipment authentication data composed of the plural data rows could be received.

Incidentally, in this embodiment, although the first transmission data information area of the first data row stores the information indicating that the data rows of the first data row to the sixth data row are the equipment authentication data, and the second transmission data information area of the second data row to the sixth transmission data information area of the sixth data row store the transmission data confirmation information, the invention is not limited thereto. For example, the information indicating that the data rows of the first data row to the sixth data row are the equipment authentication data may be stored in the first transmission data information area of the first data row to the fifth transmission data information area of the fifth data row, and the sixth transmission data information area of the sixth data row may store the transmission data confirmation information (checksum value of the first data row to the sixth data row) of the first data row to the sixth data row.

The contents data transmitter 20 encrypts the receiver ID information stored in the transmission ID storage part 24*a*, divides the encrypted receiver ID information, stores the first ID information to the sixth ID information into the first data area of the first data row to the sixth data area of the sixth data row shown in FIG. 3A, and transmits the first data row to the sixth data row through the first data line to the sixth data line to the contents data receiver 30 at the same time.

As shown in FIG. 3B, the equipment authentication response data is composed of a first data row, a second data row, . . . , a sixth data row. Each of the data rows includes a data area for storing one of information of divided information relating to whether or not these receiver ID information are coincident with each other in the contents data receiver 30, and a transmission data information area for storing information relating to the equipment authentication response data.

Specifically, the first data area of the first data row stores any one of information (first ID information) of six of information obtained by dividing the encrypted receiver ID information. The first transmission data information area stores information indicating that the data rows of the first data row to the sixth data row are the equipment authentication response data.

Each of the second data area of the second data row to the sixth data area of the sixth data row stores one of information (second ID information to the sixth ID information) of the six of information obtained by dividing the encrypted receiver ID information. The second transmission data information area to the sixth transmission data information area store the transmission data confirmation information indicating that the equipment authentication response data is composed of the first data row to the sixth data row. The transmission data confirmation information is, for example, a checksum value similarly to the second data row to the sixth data row of the equipment authentication data.

Incidentally, in this embodiment, although the first transmission data information area of the first data row stores the information indicating that the data rows of the first data row to the sixth data row are the equipment authentication response data, and the second transmission data information area to the sixth transmission data information area of the second data row to the sixth data row store the transmission data confirmation information, the invention is not limited thereto. For example, the information indicating that the data rows of the first data row to the sixth data row are the equipment authentication response data may be stored in the first transmission data information area to the fifth transmission data information area of the first data row to the fifth data row, and the sixth transmission data information area of the sixth data row may store the transmission data confirmation information (checksum value of the first data row to the sixth data row) of the first data row to the sixth data row.

In the case where the receiver ID information transmitted by the contents data transmitter 20 is coincident with the receiver ID information assigned to the contents data receiver 30, the information indicating whether or not both of receiver ID information are coincident with each other in the contents data receiver 30 is the encrypted information of the receiver ID information stored in the reception ID storage part 32a of the contents data receiver 30. The information is divided, and the divided first ID information to the sixth ID information are stored in the first data area of the first data row to the sixth data area of the sixth data row, respectively.

In the case where the receiver ID information transmitted by the contents data transmitter 20 is not coincident with the receiver ID information assigned to the contents data receiver 30, the information relating to whether or not both of receiver ID information are coincident with each other in the contents data receiver 30 is data of all "0", and the data of "0" is stored in the first data area of the first data row to the sixth data area of the sixth data row.

In this embodiment, in the case where the receiver ID information transmitted by the contents data transmitter 20 is coincident with the receiver ID information assigned to the contents data receiver 30, the information relating to whether or not both of receiver ID information are coincident with each other in the contents data receiver 30 is the encrypted receiver ID information, however, other information (for example, data of all "1") may be adopted. Besides, in this embodiment, in the case where the receiver ID information transmitted by the contents data transmitter 20 is not coincident with the receiver ID information assigned to the contents data receiver 30, the information relating to whether or not both of receiver ID information are coincident with each other in the contents data receiver 30 is made the data of all "0", however, other information (for example, data of "101010 . . . ") may be adopted.

When receiving the equipment authentication data transmitted from the contents data transmitter 20, the contents data receiver 30 extracts the first ID information to the sixth ID information stored in the first data row to the sixth data row, decrypts these information to acquire the receiver ID information, and compares it with the receiver ID information stored in the reception ID storage part 32a of the receiver ID authentication part 32. In the case where the receiver ID information transmitted from the contents data transmitter 20 is coincident with the receiver ID information stored in the reception ID storage part 32a, the contents data receiver 30 encrypts and divides the receiver ID information stored in the reception ID storage part 32a, stores it into the first data area of the first data row to the sixth data area of the sixth data row shown in FIG. 3B, and sequentially transmits the first data row to the sixth data row through the response line to the contents data transmitter 20.

The transmission of the equipment authentication response data from the contents data receiver 30 to the contents data transmitter 20 may be sequentially performed at predetermined time intervals in such a manner that after the first data row is transmitted, the second data row is transmitted after a predetermined time has passed.

In the case where as the equipment authentication response data, the first data row to the sixth data row are continuously transmitted through the response line, it becomes easy to extract the first data row to the sixth data row as one data row from the response line, and it becomes easy to obtain the receiver ID information of the equipment from the extracted data. Then, an equipment (for example, a personal computer) other than the equipment set by the receiver ID information is connected to the DVD player, the personal computer is made to be recognized as the AV amplifier by using the extracted receiver ID information to obtain the key information and the encrypted contents data, the encrypted contents data is decrypted by the key information, and the decrypted contents data can be illegally copied and recorded.

Thus, the first data row to the sixth data row are transmitted at predetermined intervals in such a manner that after the first data row of the equipment authentication response data is transmitted, the second data row is transmitted after a predetermined time has passed, so that it becomes possible to make difficult extract the ID information as one data row from the response line.

Figure 4B:
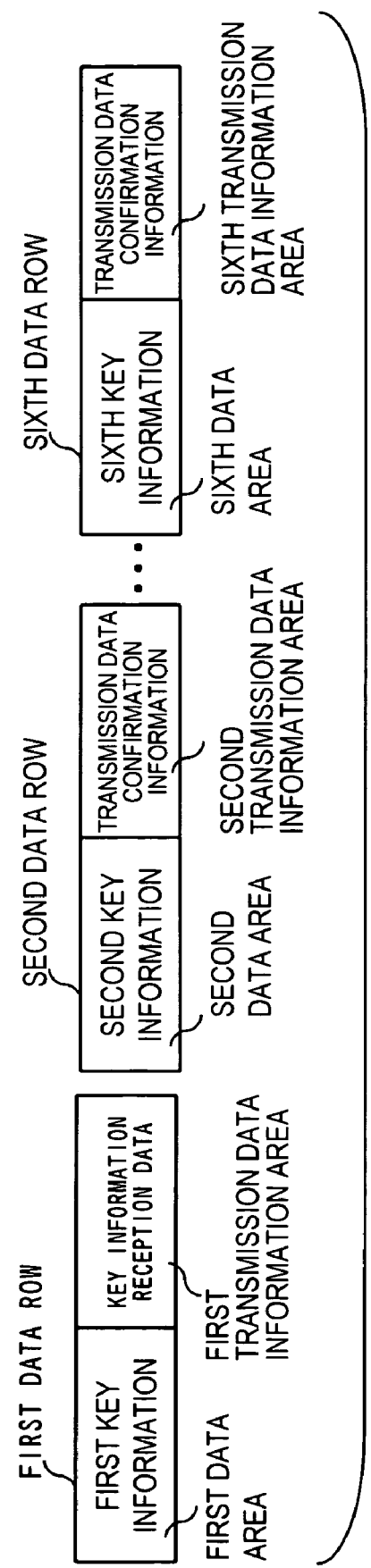

FIGS. 4A and 4B are views showing formats of the key information transmission data and the key information reception data in the contents data transmission/reception system of this embodiment. FIG. 4A shows the key information transmission data transmitted from the contents data transmitter to the contents data receiver. FIG. 4B shows the key information reception data transmitted from the contents data receiver to the contents data transmitter.

As shown in FIG. 4A, the key information transmission data is composed of a first data row, a second data row, . . . , a sixth data row. Each of the data rows includes a data area for storing any one of information of a plurality of information obtained by dividing the encrypted key information, and a transmission data information area for storing information relating to the key information transmission data.

Specifically, the first data area of the first data row stores any one of information (first key information) of six of information obtained by dividing the encrypted key information. The first transmission data information area stores information indicating that the data rows of the first data row to the sixth data row are the key information transmission data.

Each of the second data area of the second data row to the sixth data area of the sixth data row stores one of information (second key information to sixth key information) of the six of information obtained by dividing the encrypted key information. The second transmission data information area to the sixth transmission data information area store the transmission data confirmation information indicating that the key information transmission data is composed of the first data row to the sixth data row.

The transmission data confirmation information is, for example, a checksum value similarly to the second data row to the sixth data row of the equipment authentication data. The contents data receiver 30 confirms the checksum value of the transmission data confirmation information and confirms whether or not all the key information transmission data composed of the plural data rows could be received.

Incidentally, in this embodiment, the first transmission data information area of the first data row stores the information indicating that the data rows of the first data row to the sixth data row are the key information transmission data, and the second transmission data information area to the sixth transmission data information area of the second data row to the sixth data row store the transmission data confirmation information, however, the invention is not limited thereto. For example, the information indicating that the data rows of the first data row to the sixth data row are the key information transmission data may be stored in the first transmission data information area to the fifth transmission data information area of the first data row to the fifth data row, and the sixth transmission data information area of the sixth data row may store the transmission data confirmation information (checksum value of the first data row to the sixth data row) of the first data row to the sixth data row.

As shown in FIG. 4A, the contents data transmitter 20 stores the six of information obtained by dividing the encrypted key information into the first data area of the first data row to the sixth data area of the sixth data row, and the first data row to the sixth data row are transmitted through the first data line to the sixth data line to the contents data receiver 30 at the same time.

As shown in FIG. 4B, the key information reception data is composed of a first data row, a second data row, . . . , a sixth data row. Each of the data rows includes a data area for storing any one of a plurality of information obtained by encrypting information indicating whether or not the key information is acquired and by dividing the encrypted information, and a transmission data information area for storing information relating to the key information reception data.

Specifically, the first data area of the first data row stores any one of information (first key information) of six of information obtained by dividing the information indicating whether or not the key information is acquired. The first transmission data information area stores information indicating that the data rows of the first data row to the sixth data row are the key information reception data.

Each of the second data area of the second data row to the sixth data area of the sixth data row store one of information (second key information to the sixth key information) of the six of information obtained by dividing the information indicating whether or not the key information is acquired. The second transmission data information area to the sixth transmission data information area store the transmission data confirmation information indicating that the key information reception data is composed of the first data row to the sixth data row. The transmission data confirmation information is, for example, a checksum value similarly to the second data row to the sixth data row of the equipment authentication data.

The information indicating whether or not the key information is acquired is, for example, data of all "1" in the case where the contents data receiver 30 acquired the key information, and data of all "0" in the case where the contents data receiver 30 could not acquire the key information.

Incidentally, in this embodiment, the first transmission data information area of the first data row stores the information indicating that the data rows of the first data row to the sixth data row are the key information reception data, and the second transmission data information area to the sixth transmission data information area of the second data row to the sixth data row store the transmission data confirmation information, however, the invention is not limited thereto. For example, the information indicating that the data rows of the first data row to the sixth data row are the key information reception data may be stored in the first transmission data information area to the fifth transmission data information area of the first data row to the fifth data row, and the sixth transmission data information area of the sixth data row may store the transmission data confirmation information (checksum value of the first data row to the sixth data row) of the first data row to the sixth data row.

In the case where the key information transmitted by the contents data transmitter 20 could be acquired, the contents data receiver 30 stores data of "1" into all bits of the first data area of the first data row to the sixth data area of the sixth data row, and sequentially transmits the first data row to the sixth data row to the contents data transmitter 20 through the response line.

In the case where the key information transmitted by the contents data transmitter 20 could not be acquired, the contents data receiver 30 stores data of "0" into all bits of the first data area of the first data row to the sixth data area of the sixth data row, and sequentially transmits the first data row to the sixth data row to the contents data transmitter 20 through the response line.

In this embodiment, the information relating to the acquisition of the key information is made the data of all "1" in the case where the contents data receiver 30 acquired the key information, and is made the data of all "0" in the case where the contents data receiver 30 could not acquire the key information, however, the invention is not limited thereto. Data of another pattern may be adopted as long as the case where the key information could be acquired can be discriminated from the case where the key information could not be acquired. For example, in the case where the contents data receiver 30 acquired the key information, bits of the half of each data area of the first data area of the first data row to the sixth data area of the sixth data row are made data of "1", and bits of the remaining half are made data of "0".

Besides, when the contents data receiver 30 transmits the key information reception data to the contents data transmitter 20 through the response line, similarly to the foregoing equipment authentication response data, the contents data receiver 30 may sequentially transmit the first data row to the sixth data row at predetermined time intervals.

Besides, in this embodiment, although the key information reception data is composed of the plural data rows, it may be one data row composed of a data area for storing information indicating whether or not the key information is acquired, and a transmission data information area for storing information indicating that the data row is the key information reception data.

Figure 5B:
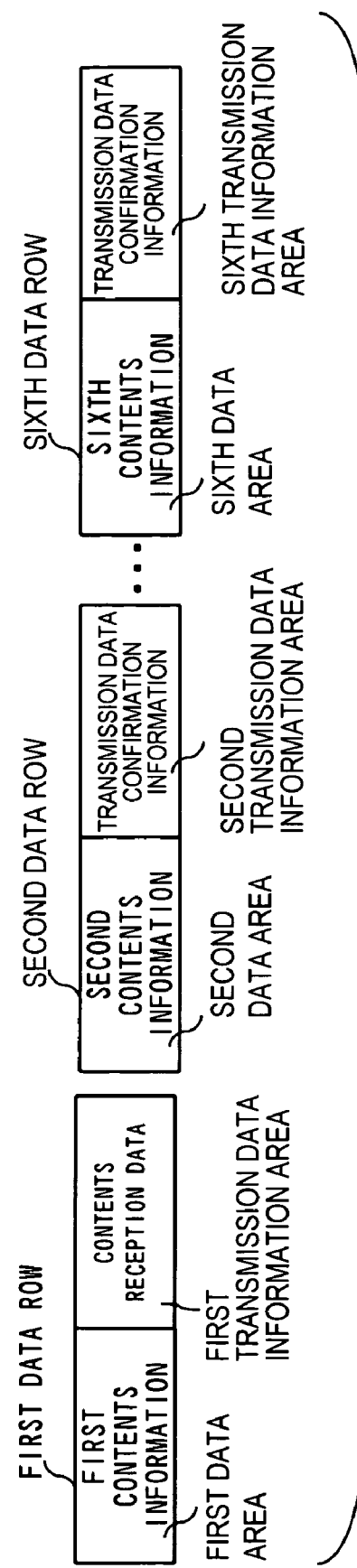

FIGS. 5A and 5B are views showing formats of the contents transmission data and the contents reception data in the contents data transmission/reception system of this embodiment. FIG. 5A shows the contents transmission data transmitted from the contents data transmitter to the contents data receiver. FIG. 5B shows the contents reception data transmitted from the contents data receiver to the contents data transmitter.

As shown in FIG. 5A, the contents transmission data is composed of a first data row, a second data row, . . . , a sixth data row. Each of the data row includes a data area where any one of information of a plurality of information obtained by dividing the encrypted contents data is stored, and a transmission data information area for storing information relating to the contents transmission data.

Specifically, the first data area of the first data row stores any one of information (first contents data) of six of information obtained by dividing the encrypted contents data. The first transmission data information area stores information indicating that the data rows of the first data row to the sixth data row are the contents transmission data.

Each of the second area to the sixth area of the second. data row to the sixth data row stores one of information (second contents information to the sixth contents information) of the six of information obtained by dividing the encrypted contents data. The second transmission data information area to the sixth transmission data information area store the transmission data confirmation information indicating that the contents transmission data is composed of the first data row to the sixth data row.

The transmission data confirmation information is, for example, a checksum value similarly to the second data row to the sixth data row of the key information transmission data. The contents data receiver 30 confirms the checksum value of the transmission data confirmation information to confirm whether or not all the contents transmission data composed of the plural data rows could be received.

Incidentally, in this embodiment, the first transmission data information area of the first data row stores the information indicating that the data rows of the first data row to the sixth data row are the contents transmission data, and the second transmission data information area to the sixth transmission data information area of the second data row to the sixth data row store the transmission data confirmation information, however, the invention is not limited thereto. For example, the information indicating that the data rows of the first data row to the sixth data row are the contents transmission data may be stored in the first transmission data information area to the fifth transmission data information area of the first data row to the fifth data row, and the sixth transmission data information area of the sixth data row may store the transmission data confirmation information (checksum value of the first data row to the sixth data row) of the first data row to the sixth data row.

In this embodiment, although the encrypted contents data is divided and the respective divided information is stored in the respective data areas of the respective data rows, the invention is not limited thereto. For example, in the case where the contents data is multi-channel audio data, the audio data of L, R, surround L, surround R, center, and subwoofer are encrypted for the respective channels, become data of encrypted L, encrypted R, encrypted surround L, encrypted surround R, encrypted center, and encrypted subwoofer, and the encrypted contents data may be stored in the first data area to the sixth data area of the first data row to the sixth data row, respectively.

As shown in FIG. 5A, the contents data transmitter 20 stores the encrypted contents data into the first data area of the first data row to the sixth data area of the sixth data row, respectively, and transmits the first data row to the sixth data row through the first data line to the sixth data line to the contents data receiver 30 at the same time.

In this embodiment, the transmission of the encrypted contents data from the contents data transmitter 20 to the contents data receiver 30 is performed as described above in such a manner that the encrypted contents data are stored in the data rows composed of the data areas and the transmission data information areas, and the first data row to the sixth data row are transmitted at once. However, a method may be adopted in which a data row composed of only the transmission data information area is first transmitted as a header, and subsequently to the data row, a data row composed of only the data area is transmitted.

In this case, in the second and the following transmission of the contents transmission data, since the data amount of the encrypted contents data which can be transmitted at a time is larger than the data amount of the encrypted contents data transmitted in the format of FIG. 5A, a large amount of encrypted contents data can be transmitted from the contents data transmitter 20 to the contents data receiver 30 in a shorter time.

As shown in FIG. 5B, the contents reception data is composed of a first data row, a second data row, . . . , a sixth data row. Each of the data rows includes a data area for storing one of information of a plurality of information obtained by encrypting information indicating whether or not the encrypted contents data could be received and by dividing the encrypted information, and a transmission data information area for storing information relating to the contents reception data.

Specifically, the first data area of the first data row stores any one of information (first contents information) of six of information obtained by dividing the information indicating whether or not the encrypted contents data could be received. The first transmission data information area stores information indicating that the data rows of the first data row to the sixth data row are the contents reception data.

Each of the second data area of the second data row to the sixth data area of the sixth data row stores one of information (second contents information to sixth contents information) of the six of information obtained by dividing the information indicating whether or not the encrypted contents data could be received. The second transmission data information area to the sixth transmission data information area store the transmission data confirmation information indicating that the contents reception data is composed of the first data row to the sixth data row. The transmission data confirmation information is, for example, a checksum value similarly to the second data row to the sixth data row of the key information reception data.

Incidentally, in this embodiment, the first transmission data information area of the first data row stores the information indicating that the data rows of the first data row to the sixth data row are the contents reception data, and the second transmission data information area to the sixth transmission data information area of the second data row to the sixth data row store the transmission data confirmation information, however, the invention is not limited thereto. For example, the information indicating that the data rows of the first data row to the sixth data row are the contents reception data may be stored in the first transmission data information area to the fifth transmission data information area of the first data row to the fifth data row, and the sixth transmission data information area of the sixth data row may store the transmission data confirmation information (checksum value of the first data row to the sixth data row) of the first data row to the sixth data row.

The information indicating whether or not the encrypted contents data could be received is, for example, data of all "1" in the case where the contents data receiver 30 received the encrypted contents data, and data of all "0" in the case where the contents data receiver 30 could not receive the encrypted contents data.

In the case where the contents data receiver 30 could receive encrypted contents data transmitted by the contents data transmitter 20 could be receive, the contents data receiver 30 stores the data of "1" into all bits of the first data area of the first data row to the sixth data area of the sixth data row, and sequentially transmits the first data row to the sixth data row to the contents data transmitter 20 through the response line.

In the case where the contents data receiver 30 could not receive the encrypted contents data transmitted by the contents data transmitter 20, the contents data receiver 30 stores the data of "0" into all bits of the first data area of the first data row to the sixth data area of the sixth data row, and sequentially transmits the first data row to the sixth data row to the contents data transmitter 20 through the response line.

In this embodiment, the information relating to the acquisition of the key information is made the data of all "1" in the case where the contents data receiver 30 received the encrypted contents data, and the data of all "0" in the case where the contents data receiver 30 could not receive the encrypted contents data, however, the invention is not limited thereto. Data of another pattern may be adopted as long as the case where the encrypted contents data could be received can be discriminated from the case where the encrypted contents data could not be received. For example, in the case where the contents data receiver 30 received the encrypted contents data, bits of the half of each data area of the first data area of the first data row to the sixth data area of the sixth data row are made data of "1", and bits of the remaining half are made data of "0".

Besides, similarly to the foregoing equipment authentication response data, the contents data receiver 30 may sequentially transmit the first data row to the sixth data row at predetermined time intervals when the contents data receiver 30 transmits the contents reception data to the contents data transmitter 20 through the response line.

Besides, in this embodiment, although the contents reception data is composed of the plural data row, it may be one data row composed of a data area for storing the information indicating whether or not the encrypted contents data could be received, and a transmission data information area for storing the information indicating that the data row is the contents reception data.

Besides, in this embodiment, although the contents reception data is transmitted to the contents data transmitter 20 each time the contents data receiver 30 receives the contents transmission data, the invention is not limited thereto. The contents data receiver 30 may transmit the contents reception data to the contents data transmitter 20 at predetermined time intervals after the contents data transmitter 20 starts to transmit the contents transmission data. Alternatively, the contents data receiver 30 may transmit the contents reception data to the contents data transmitter 20 after the contents data transmitter 20 starts to transmit the contents transmission data and in the case where an interval for reception of the contents transmission data exceeds a predetermined time.

Next, the flow of transmission/reception of data in the contents data transmission/reception system of this embodiment will be described.

Figure 6:
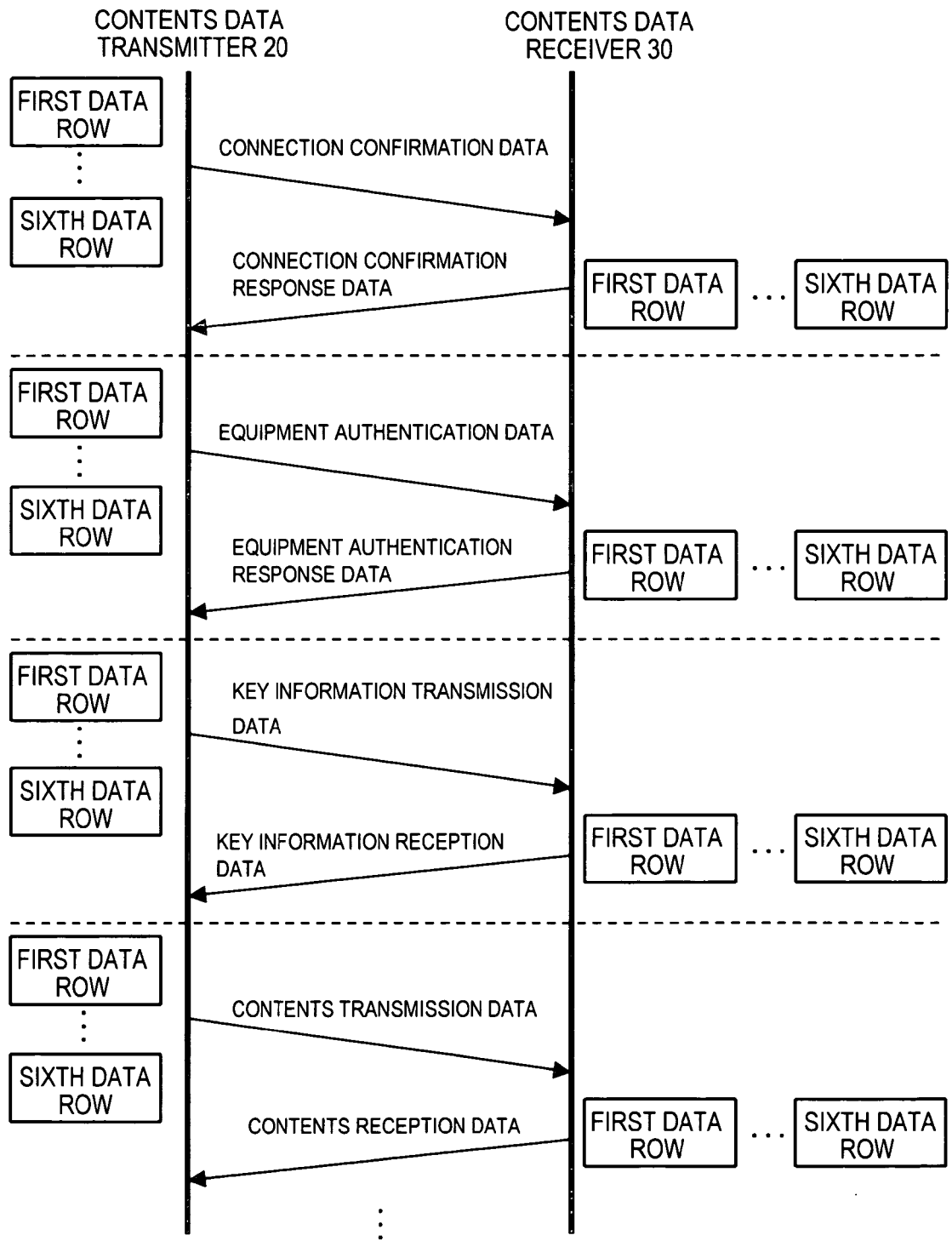
FIG. 6 is a view for explaining an embodiment of a contents data transmission/reception method of the invention.

FIG. 6 is a view for explaining an embodiment of a contents data transmission/reception method of the invention. In FIG. 6, the vertical axis of the drawing indicates the flow of time.

In order to confirm whether or not the contents data transmitter 20 and the contents data receiver 30 are connected with each other through the signal lines, the contents data transmitter 20 transmits the connection confirmation data shown in FIG. 2A from the transmitter transmission/reception part 25 through the first data line to the sixth data line to the contents data receiver 30.

When the receiver transmission/reception part 31 receives the connection confirmation data transmitted from the contents data transmitter 20, the contents data receiver 30 transmits the connection confirmation response data shown in FIG. 2B from the receiver transmission/reception part 31 through the response line to the contents data transmitter 20.

When the transmitter transmission/reception part 25 receives the connection confirmation response data transmitted from the contents data receiver 30, the contents data transmitter 20 extracts one of receiver ID information from the plural of receiver ID information individually assigned to the respective contents data receivers stored in the transmission ID storage part 24*a* of the transmitter ID authentication part 24, encrypts the extracted receiver ID information, divides the encrypted receiver ID information, stores it into the equipment authentication data shown in FIG. 3A, and transmits it from the transmitter transmission/reception part 25 through the first data line to the sixth data line to the contents data receiver 30.

When the receiver transmission/reception part 31 receives the equipment authentication data transmitted from the contents data transmitter 20, the contents data receiver 30 extracts the receiver ID information stored in the ID information area from the equipment authentication data, decrypts the extracted receiver ID information, and compares the decrypted receiver ID information with the receiver ID information stored in the reception ID storage part 32*a* of the receiver ID authentication part 32.

In the case where the receiver ID information extracted from the equipment authentication data is coincident with the receiver ID information stored in the reception ID storage part 32*a*, the contents data receiver 30 encrypts information (for example, data of all "0") indicating that both of reception ID information are not coincident with each other, divides the encrypted data, stores it into the equipment authentication response data shown in FIG. 3B, and transmits it from the receiver transmission/reception part 31 through the response line to the contents data transmitter 20.

When the transmitter transmission/reception part 25 receives the equipment authentication response data transmitted from the contents data receiver 30, the contents data transmitter 20 extracts the data stored in the equipment authentication response data, and confirms from the data whether or not these receiver ID information are coincident with each other in the contents data receiver 30.

In the case where the data obtained from the equipment authentication response data is information indicating that these receiver ID information are coincident with each other in the contents data receiver 30, the contents data transmitter 20 starts to reproduce the contents data in the contents reproduction part 21, and the key information generation part 23 starts a processing to encrypt the contents data by using the key information in the contents encryption part 22.

The contents data transmitter 20 starts to encrypt the contents data, and at the same time, encrypts the key information generated by the key information generation part 23, divides the encrypted data, stores it into the key information transmission data shown in FIG. 4A, and transmits it from the transmitter transmission/reception part 25 through the first data line to the sixth data line to the contents data receiver 30.

In the case where the data obtained from the equipment authentication response data is information indicating that the receiver ID information are not coincident with each other in the contents data receiver 30, the contents data transmitter 20 extracts one of receiver ID information from the plural of receiver ID information, which are stored in the transmission ID storage part 24a of the transmitter ID authentication part 24, except for the receiver ID information already transmitted to the contents data receiver 30, encrypts the receiver ID information, divides the encrypted data, stores it into the equipment authentication data shown in FIG. 3A, and again transmits it from the transmitter transmission/reception part 25 through the first data line to the sixth data line to the contents data receiver 30. The contents data transmitter 20 repeats this processing until the transmitted receiver ID information is coincident with the receiver ID information assigned to the contents data receiver 30.

When the receiver transmission/reception part 31 receives the key information transmission data transmitted from the contents data transmitter 20, the contents data receiver 30 extracts the data stored in the key information area from the key information transmission data, decrypts the extracted data and acquires the key information. This key information becomes encryption breaking information for breaking the encryption of the encrypted contents data.

In the case where the key information could be acquired from the key information transmission data, the contents data receiver 30 encrypts information (for example, data of all "1") indicating that the key information was acquired, divides the encrypted data, stores it into the key information reception data shown in FIG. 4B, and transmits it from the receiver transmission/reception part 31 through the response line to the contents data transmitter 20.

In the case where the key information could not be acquired from the key information transmission data, the contents data receiver 30 encrypts information (for example, data of all "0") indicating that the key information could not be acquired, divides the encrypted data, stores it into the key information reception data shown in FIG. 4B, and transmits it from the receiver transmission/reception part 31 through the response line to the contents data transmitter 20.

When the transmitter transmission/reception part 25 receives the key information reception data transmitted from the contents data receiver 30, the contents data transmitter 20 extracts the data stored in the reception data area of the key information reception data, and confirms whether or not the contents data receiver 30 acquired the key information.

In the case where the key information could not be acquired in the contents data receiver 30, the contents data transmitter 20 again transmits the key information transmission data from the transmitter transmission/reception part 25 through the first data line to the sixth data line to the contents data receiver 30.

In the case where the key information could be acquired in the contents data receiver 30, the contents data transmitter 20 divides the encrypted contents data encrypted by the contents encryption part 22, stores the divided data into the contents transmission data shown in FIG. 5A, and transmits it from the transmitter transmission/reception part 25 through the first data line to the sixth data line to the contents data receiver 30.

In the case where the key information could not be acquired in the contents data receiver 30, the contents data receiver 30 encrypts information (for example, data of all "0") indicating that the contents data could not be acquired, divides the encrypted data, stores it into the contents reception data shown in FIG. 5B, and transmits it from the receiver transmission/reception part 31 through the response line to the contents data transmitter 20.

When the receiver transmission/reception part 31 receives the contents transmission data transmitted from the contents data transmitter 20, the contents data receiver 30 extracts the encrypted contents data stored in the contents transmission data, decrypts the encrypted contents data by using the key information extracted by the key information extraction part 33 in the contents decryption part 34, and outputs it to the output part 35.

The output part 35 performs digital-to-analog conversion, amplification and the like to the contents data outputted from the contents decryption part 34 and outputs it.

When receiving the contents transmission data transmitted by the contents data transmitter 20 and decrypting the encrypted contents data, the contents data receiver 30 encrypts information indicating that the encrypted contents data was acquired, divides the encrypted data, stores it into the contents reception data shown in FIG. 5B, and transmits it from the receiver transmission/reception part 31 through the response line to the contents data transmitter 20.

When receiving the contents reception data transmitted from the contents data receiver 30, the contents data transmitter 20 confirms, from the information indicating that the contents data stored in the contents reception data was acquired, whether or not the contents data receiver 30 could acquire the contents data.

In the case where the contents data receiver 30 could acquire the contents data, the contents data transmitter 20 stores next encrypted contents data into the contents transmission data shown in FIG. 5A, and transmits the contents transmission data from the transmitter transmission/reception part 25 through the first data line to the sixth data line to the contents data receiver 30.

In the case where the contents data receiver 30 could not receive the contents data, the contents data transmitter 20 again transmits the transmitted contents transmission data from the transmitter transmission/reception part 25 through the first data line to the sixth data line to the contents data receiver 30.

In this way, the contents data is transmitted from the contents data transmitter 20 to the contents data receiver 30.

As described above, in the contents data transmission/reception system, the contents data transmitter 20 encrypts the receiver ID information for performing the equipment authentication, the key information for decrypting the encrypted contents data, and the contents data, stores the encrypted data into the respective data composed of the plural data rows, and transmits the data to the contents data receiver 30 by using the plural signal lines.

From this, since the receiver ID information, the key information, and the encrypted contents data outputted by the contents data transmitter 20 can not be acquired from a single signal line, it is possible to prevent the contents data from being illegally copied by illegally obtaining the receiver ID information, the key information and the encrypted contents data to decrypt the encrypted contents data by using the key information.

In the embodiment described above, although the contents data transmitter 20 uses one key information to encrypt a contents data, and the contents data receiver 30 uses one key information transmitted from the contents data transmitter 20 to decrypt an encrypted contents data, the encryption of a contents data may be performed by using a plurality of key information.

An embodiment of the present invention in which the encryption of a contents data is performed by using a plurality of key information will be described below.

FIG. 7 is a schematic structural view showing another embodiment of a contents data transmission/reception system of the invention. Here, the contents data transmitter 20 includes a contents reproduction part 21, a contents encryption part 22, a key information generation part 23, a transmitter ID authentication part 24, a transmitter transmission/reception part 25, and a transmitter control part 26. Among them, description of the contents reproduction part 21, the contents encryption part 22, the transmitter ID authentication part 24, and the transmitter control part 26 will be omitted since the structure thereof is similar to the contents reproduction part 21, the contents encryption part 22, the transmitter ID authentication part 24, and the transmitter control part 26 in the aforementioned embodiment.

The key information generation part 23 generates a plurality of key information for use in the encryption of a contents data. The key information is information composed of, for example, a data row of plural bits, and a generation method of the key information is not particularly limited and any method may be used.

The key information generation part 23 includes a key information generation control part 23$a$. The key information generation control part 23$a$ includes a storage unit (not shown) for storing a plurality of key information generated within the key information generation part 23, and a timer for measuring the time the key information generation part 23 takes to select one key information from a plurality of key information stored in the storage unit.

The key information generation control part 23$a$ stores a plurality of key information in the storage unit, which are generated within the key information generation part 23. The key information generation control part 23$a$ encrypts a plurality of key information respectively, and outputs all the encrypted key information to the transmitter transmission/reception part 25 when the key information is transmitted to the contents data receiver 30.

In the key information generation part 23, the key information is encrypted by a previously determined method. An after-mentioned key information extraction part 33 of the contents data receiver 30 has a decryption processing function for decrypting the encryption of the key information performed by the key information generation part 23 and the key information encrypted by the key information generation part 23 can be decrypted by the after-mentioned key information extraction part 33. In this embodiment, although the key information generation part 23 encrypts the key information and transmits it to the contents data receiver 30, the key information may be transmitted to the contents data receiver 30 without being encrypted.

The key information generation control part 23$a$ selects one key information for use in the encryption of the contents data from a plurality of key information stored in the storage unit, outputs the selected key information to the contents encryption part 22 and outputs selection information regarding the selected key information to the transmitter transmission/reception part 25. The selection information is information indicating which is the key information selected from a plurality of key information and is a number such as 1 or 2. A method of selecting the key information in the key information generation control part 23$a$ is not particularly limited, and the key information may be selected in number order, or in a random order.

When the contents reproduction part 21 starts to reproduce the contents data, the key information generation control part 23$a$ selects one key information from a plurality of key information stored in the storage unit, outputs the selected key information to the content encryption part 22, and, at the same time, starts to measure the time by the timer. The key information generation control part 23$a$ again selects one key information from a plurality of key information stored in the storage unit, and outputs the selected key information to the contents encryption part 22 when a predetermined time has passed since the previous key information is selected. The contents encryption part 22 uses new key information input from the key information generation part 23 to encrypt the contents data. Furthermore, the key information generation part 23 outputs the selection information regarding the selected key information to the transmitter transmission/reception part 25 every time the new key information is selected.

The transmitter transmission/reception part 25 has the same function as the transmitter transmission/reception part 25 of the contents data transmitter 20 in the aforementioned embodiment. In addition to the function, when the key information transmission data is transmitted, the transmitter transmission/reception part 25 stores a plurality of key information transmitted from the key information generation part 23 into the key information transmission data, and transmits it to the contents data receiver 30. A plurality of key information may be stored into the key information transmission data, being encrypted, without being encrypted, or divided to be stored into the plural data rows, changing the order of the data.

Furthermore, the transmitter transmission/reception part 25 also stores the selection information input from the key information generation part 23, into the contents transmission data, and transmits it to the contents data receiver 30 on transmitting the encrypted contents data transmitted from the contents encryption part 22, which is being stored in the contents transmission data. The selection information may be stored in all the first transmission data information area to the sixth transmission data information area of the first data row to the sixth data row, or any one of them.

As described above, the contents data transmitter 20 of this embodiment generates a plurality of key information in the key information generation part 23, stores all a plurality of key information into the key information transmission data, and transmits it to the contents data receiver 30 when transmitting the key information to the contents data receiver 30. Furthermore, the key information generation part 23 selects one key information from a plurality of key information at every predetermined time, outputs the selected key information to the contents encryption part 22, and at the same time, transmits the selection information regarding the selected key information to the transmitter transmission/reception part 25.

The contents encryption part 22 encrypts the contents data based on the key information transmitted from the key information generation part 23 at the predetermined interval, and outputs it to the transmitter transmission/reception part 25. The transmitter transmission/reception part 25 stores the encrypted contents data transmitted from the contents encryption part 22 and selection information regarding the key information transmitted from the key information generation part 23 into the contents transmission data and transmits it to the contents data receiver 30.

Specifically, the contents data transmitter 20 encrypts the contents data by using the key information which differs at every predetermined time, and transmits the encrypted contents data and the selection information regarding the key information used in the encryption to the contents data receiver 30. Note that the key information used may be randomly selected and may often be the same.

The contents data receiver 30 includes a receiver transmission/reception part 31, a receiver ID authentication part 32, a key information extraction part 33, a contents decryption part 34, an output part 35, and a receiver control part 36. Among them, since the receiver ID authentication part 32, the contents decryption part 34, the output part 35, and the receiver control part 36 are similar to the receiver ID authentication part 32, the contents decryption part 34, the output part 35, and the receiver control part 36 in the contents data receiver 30 of the aforementioned embodiment, the description thereof will be omitted.

The receiver transmission/reception part 31 has the same function as the receiver transmission/reception part 31 of the aforementioned embodiment. In addition to the function, The receiver transmission/reception part 31 outputs the selection information contained in the contents transmission data to the key information extraction part 33 when receiving the contents transmission data.

The key information extraction part 33 extracts a plurality of key information stored in the key information transmission data which is received by the receiver transmission/reception part 31, and acquires the key information. The key information extraction part 33 includes a key information storage part 33a and stores the acquired key information in the key information storage part 33a.

When the contents transmission data is transmitted from the contents data transmitter 20, the key information extraction part 33 selects one key information from a plurality of key information stored in the key information storage part 33a based on the selection information contained in the contents transmission data and outputs the selected key information to the contents decryption part 34.

As described above, the contents data receiver 30 stores a plurality of key information transmitted from the contents data transmitter 20 in the key information storage part 33a. Thereafter, the contents data receiver 30 selects one key information from a plurality of key information based on the selection information which is transmitted together with the encrypted contents data, and decrypts the encrypted contents data by using the selected key information.

Next, the flow of transmission/reception of data in the contents data transmission/reception system of this embodiment in the invention will be described.

In FIG. 6, in order to confirm whether or not the contents data transmitter 20 and the contents data receiver 30 are connected with each other through the signal lines, the contents data transmitter 20 transmits the connection confirmation data shown in FIG. 2A from the transmitter transmission/reception part 25 through a first data line to a sixth data line to the contents data receiver 30.

When the receiver transmission/reception part 31 receives the connection confirmation data transmitted from the contents data transmitter 20, the contents data receiver 30 transmits the connection confirmation response data shown in FIG. 2B from the receiver transmission/reception part 31 through a response line to the contents data transmitter 20.

When the transmitter transmission/reception part 25 receives the connection confirmation response data transmitted from the contents data receiver 30, the contents data transmitter 20 extracts one of receiver ID information individually assigned to the respective contents data receivers stored in the transmission ID storage part 24a of the transmitter ID authentication part 24, encrypts the extracted receiver ID information, divides the encrypted receiver ID information, stores it into equipment authentication data shown in FIG. 3A, and transmits it from the transmitter transmission/reception part 25 through the first data line to the sixth data line to the contents data receiver 30.

When the receiver transmission/reception part 31 receives the equipment authentication data transmitted from the contents data transmitter 20, the contents data receiver 30 extracts the receiver ID information stored in the ID information area from the equipment authentication data, decrypts the extracted receiver ID information, and compares the decrypted receiver ID information with the receiver ID information stored in the reception ID storage part 32a of the receiver ID authentication part 32.

In the case where the receiver ID information extracted from the equipment authentication data is coincident with the receiver ID information stored in the reception ID storage part 32a, the contents data receiver 30 encrypts the receiver ID information, divides the encrypted data, stores it into the equipment authentication response data shown in FIG. 3B, and transmits it from the receiver transmission/reception part 31 through the response line to the contents data transmitter 20.

In the case where the receiver ID information extracted from the equipment authentication data is not coincident with the receiver ID information stored in the reception ID storage part 32a, the contents data receiver 30 encrypts information (for example, data of all "0") indicating that both of these reception ID information are not coincident with each other, divides the encrypted data, stores it into the equipment authentication response data shown in FIG. 3B, and transmits it from the receiver transmission/reception part 31 through the response line to the contents data transmitter 20.

When the transmitter transmission/reception part 25 receives the equipment authentication response data transmitted from the contents data receiver 30, the contents data transmitter 20 extracts the data stored in the equipment authentication response data, and confirms based on the data whether or not the receiver ID information are coincident with each other in the contents data receiver 30.

In the case where the data obtained from the equipment authentication response data is information indicating that the receiver ID information are coincident with each other in the contents data receiver 30, the contents data transmitter 20 starts to generate a plurality of key information in the key information generation part 23, encrypts a plurality of key information thus generated, divides the encrypted data, stores it into the key information transmission data shown in FIG. 4A, and transmits it from the transmitter transmission/reception part 25 through the first data line to the sixth data line to the contents data receiver 30.

In the case where the data obtained from the equipment authentication response data is information indicating that the receiver ID information are not coincident with each other in the contents data receiver 30, the contents data transmitter 20 extracts one of receiver ID information from a plurality of receiver ID information, which are stored in the transmission ID storage part 24a of the transmitter ID authentication part 24, except for the receiver ID information already transmitted to the contents data receiver 30, encrypts the receiver ID information, divides the encrypted data, stores it into the equipment authentication data shown in FIG. 3A, and again transmits it from the transmitter transmission/reception part 25 through the first data line to the sixth data line to the contents data receiver 30. The contents data transmitter 20 repeats this processing until the transmitted receiver ID information is coincident with the receiver ID information assigned to the contents data receiver 30.

When the receiver transmission/reception part 31 receives the key information transmission data transmitted from the contents data transmitter 20, the contents data receiver 30 extracts the data stored in the key information area from the key information transmission data, decrypts the extracted data, and acquires a plurality of key information. This key information is stored in the key information storage part 33*a*.

In the case where the key information could be acquired from the key information transmission data, the contents data receiver 30 encrypts information (for example, data of all "1") indicating that the key information was acquired, divides the encrypted data, stores it into the key information reception data shown in FIG. 4B, and transmits it from the receiver transmission/reception part 31 through the response line to the contents data transmitter 20.

In the case where the key information could not be acquired from the key information transmission data, the contents data receiver 30 encrypts information (for example, data of all "0") indicating that the key information could not be acquired, divides the encrypted data, stores it into the key information reception data shown in FIG. 4B, and transmits it from the receiver transmission/reception part 31 through the response line to the contents data transmitter 20.

When the transmitter transmission/reception part 25 receives the key information reception data transmitted from the contents data receiver 30, the contents data transmitter 20 extracts the data stored in the reception data area of the key information reception data, and confirms whether or not the contents data receiver 30 acquired the key information.

In the case where the key information could not be acquired in the contents data receiver 30, the contents data transmitter 20 again transmits the key information transmission data from the transmitter transmission/reception part 25 through the first data line to the sixth data line to the contents data receiver 30.

In the case where the key information could be acquired in the contents data receiver 30, the contents data transmitter 20 starts to reproduce the contents data in the contents reproduction part 21, at the same time, selects the key information for use in the encryption of the contents data in the key information generation part 23, and starts to encrypt the contents data by using the selected key information in the contents encryption part 22.

The contents data transmitter 20 divides the encrypted contents data encrypted in the contents encryption part 22, and stores the divided data into the contents transmission data shown in FIG. 5A. The contents data transmitter 20 also stores the selection information obtained from the key information generation part 23 into the contents transmission data, and transmits it from the transmitter transmission/reception part 25 through the first data line to the sixth data to the contents data receiver 30.

In the case where the contents data receiver 30 could not acquire the contents data transmitted by the contents data transmitter 20, the contents data receiver 30 encrypts information (for example, data of all "0") indicating that the contents data could not be acquired, divides the encrypted data, stores it into the contents reception data shown in FIG. 5B, and transmits it from the receiver transmission/reception part 31 through the response line through the first data line to the sixth data line to the contents data transmitter 20.

When the receiver transmission/reception part 31 receives the contents transmission data transmitted from the contents data transmitter 20, the contents data receiver 30 extracts the selection information stored into the contents transmission data to output it to the key information extraction part 33, and at the same time, outputs the encrypted contents data to the contents decryption part 34. The key information extraction part 33 selects one key information from a plurality of key information stored in the key information storage part 33*a* based on the selection information. Then, the contents decryption part 34 decrypts the encrypted contents data by using the key information selected in the key information extraction part 33 and outputs it to the output part 35.

The output part 35 performs digital-to-analog conversion, amplification and the like to the contents data output from the contents decryption part 34 and outputs it.

When receiving the contents transmission data transmitted by the contents data transmitter 20 and decrypting the encrypted contents data, the contents data receiver 30 encrypts information indicating that the encrypted contents data was acquired, divides the encrypted data, stores it into the contents reception data shown in FIG. 5B, and transmits it from the receiver transmission/reception part 31 through the response line to the contents data transmitter 20.

When receiving the contents reception data transmitted from the contents data receiver 30, the contents data transmitter 20 confirms, based on the information indicating that the contents data stored in the contents reception data was acquired, whether or not the contents data receiver 30 could acquire the contents data.

In the case where the contents data receiver 30 could acquire the contents data, the contents data transmitter 20 stores next encrypted contents data into the contents transmission data shown in FIG. 5A, and transmits the contents transmission data from the transmitter transmission/reception part 25 through the first data line to the sixth data line to the contents data receiver 30.

In the case where the contents data receiver 30 could not receive the contents data, the contents data transmitter 20 again transmits the transmitted contents transmission data from the transmitter transmission/reception part 25 through the first data line to the sixth data line to the contents data receiver 30.

In the contents data transmitter 20, when the key information is newly selected in the key information generation control part 23*a* of the key information generation part 23, the contents encryption part 22 encrypts the contents data based on the newly selected key information, stores the selection information regarding the newly selected key information into the contents transmission data on transmitting the encrypted contents data, and transmits it to the contents data receiver 30.

In the contents data receiver 30, the key information extraction part 33 selects, based on the selection information, one key information from a plurality of key information stored in the key information storage part 33*a* based on the new selection information stored in the contents transmission data, and the contents decryption part 34 decrypts the encrypted contents data by using the key information newly obtained from the key information extraction part 33.

In this way, the contents data is transmitted from the contents data transmitter 20 to the contents data receiver 30.

Since the contents data transmission/reception system of this embodiment generates a plurality of key information for use in the encryption of the contents data, encrypts the contents data by using one key information selected from a plurality of key information, and transmits it to the contents data receiver, it is difficult to obtain the key information and the encrypted contents data illegally. Thus, it is possible to prevent the contents data from being illegally copied by decrypting the encrypted contents data by using the key information.

As described above, the contents data transmission/reception system of this invention stores, between the contents data transmitter and the contents data receiver, the receiver ID information for equipment authentication, the key information for decryption of the encrypted the contents data, and encrypted contents data into the respective data composed of the plural data rows, and transmits the data to the contents data receiver through the plural signal routes. Therefore, since the receiver ID information, the key information, and the encrypted contents data can not be acquired from a single signal route, it is possible to prevent the contents data from being illegally copied by obtaining the receiver ID information, the key information and the encrypted contents data to decrypt the encrypted contents data by using the key information.

In the foregoing embodiment, although the description has been made on the premise that the signal lines for transmitting data from the contents data transmitter 20 to the contents data receiver 30 are the six signal lines (the first data line to the sixth data line), as long as plural signal lines not less than two lines are used, any number of signal lines may be used.

When the number of signal lines for transmitting data from the contents data transmitter 20 to the contents data receiver 30 becomes large, the number of divided parts of the receiver ID information and the key information is increased, and therefore, it is possible to make it difficult to illegally acquire the receiver ID information and the key information from the signal lines. Besides, it is possible to make it difficult to acquire the encrypted contents data similarly, and at the same time, it also becomes possible to transmit audio data with more channels.

Besides, in the foregoing embodiment, when the connection confirmation data, the equipment authentication data, the key transmission data, and the contents transmission data are transmitted from the contents data transmitter to the contents data receiver, the contents data transmitter 20 transmits the plural data rows at the same time. However, the plural data rows may be transmitted while a time difference is provided. That is, after the first data row is transmitted, the second data row is transmitted after a predetermined time has passed, and similarly, the third data row to the sixth data row may be transmitted while a time difference is provided.

By this, even if the data transmitted by the contents data transmitter 20 are received at the same time, and rearrangement of information stored in the data received at the same time is merely performed, it becomes difficult to acquire correct information (for example, the receiver ID information, the key information, etc.) from the information stored in the data. Accordingly, it is possible to prevent the contents data from illegally copied by illegally acquiring the receiver ID information, the key information, and the encrypted contents data outputted by the contents data transmitter 20 and by decrypting the encrypted contents data by using the data.

While the preferred embodiments of the present invention have been illustrated in detail, it should be apparent that modifications and adaptations to those embodiments may occur to one skilled in the art without departing from the scope of the present invention as set forth in the following claims.

The disclosure of Japanese Patent Application No. JP2003-313852 filed on Sep. 5, 2003 including the specification, drawings and abstract is incorporated herein by reference in its entirety.

What is claimed is:

1. A contents data transmission/reception system comprising a contents data transmitter transmitting contents data and a contents data receiver receiving the contents data, wherein the contents data transmitter includes:

a key information selection part which generates a plurality of key information for encryption and selects a key information among a plurality of the key information;

a contents encryption part which encrypts an inputted contents data by using the key information selected by the key information selection part; and a transmitter transmission/reception part which transmits a plurality of the key information, and then the encrypted contents data and a selection information regarding the key information used in the encryption of the contents data to be transmitted, wherein the key information, the encrypted contents data and the selection information are divided to be transmitted through a plurality of signal routes respectively, and the contents data receiver includes:

a receiver transmission/reception part which receives a plurality of the key information, the encrypted contents data and the selection information through the plurality of signal routes, each of which are connected to the contents data transmitter;

a key information storage part which stores a plurality of the received key information;

a key information extraction part which extracts the key information used in the encryption of the contents data based on the selection information among a plurality of the key information stored in the key information storage part;

a contents decryption part which decrypts the encrypted contents data by using the key information extracted by the key information extraction part; and an output part which outputs the contents data decrypted by the contents decryption part.

2. The contents data transmission/reception system according to claim 1, wherein the contents data transmitter further includes a reproducing part which reproduces a contents data to input to the contents encryption part.

3. The contents data transmission/reception system according to claim 1, wherein the contents data transmitter includes a transmission ID storage part which stores a plurality of transmission ID information assigned to respective contents data receivers, the contents data receiver includes a reception ID storage part which stores a receiver ID information assigned to the contents data receiver, the contents data transmitter selects one of the transmission ID information stored in the transmission ID storage part to transmit to the contents data receiver, the contents data receiver transmits, when the received transmission ID information is coincident with the receiver ID information stored in the reception ID storage, a confirmation information indicating the coincidence to the contents data transmitter, and the contents data transmitter transmits, when received the confirmation information from the contents data receiver, the key information, the encrypted contents data and the selection information to the contents data receiver.

4. The contents data transmission/reception system according to claim 3, wherein the transmission ID information is transmitted through a plurality of signal route.

5. The contents data transmission/reception system according to claim 1, wherein
   contents data is inputted continuously, and
   the key information selection part selects one among a plurality of the key information at a predetermined time interval.

6. The contents data transmission/reception system according to claim 1, wherein
   the contents data transmitter transmits data divided in a plurality of data rows respectively through a plurality of the signal routes to the contents data receiver, and
   the data row includes data areas for the encrypted contents data and the selection information.

7. A contents data transmitter transmitting contents data, comprising:
   a key information selection part which generates a plurality of key information for encryption and selects a key information among a plurality of the key information;
   a contents encryption part which encrypts an inputted contents data by using the key information selected by the key information selection part; and
   a transmitter transmission/reception part which transmits a plurality of the key information, and then the encrypted contents data and a selection information regarding the key information used in the encryption of the contents data to be transmitted, wherein the key information, the encrypted contents data and the selection information are divided to be transmitted through a plurality of signal routes each of which are connected to a contents data receiver in that the encrypted contents data is encrypted by using a corresponding key information extracted among a plurality of the received key information based on the received selection information.

8. The contents data transmitter according to claim 7, further comprising a reproducing part which reproduces a contents data to input to the contents encryption part.

9. The contents data transmitter according to claim 7, wherein
   the contents data transmitter includes a transmission ID storage part which stores a plurality of transmission ID information assigned to respective contents data receivers, and
   the contents data transmitter selects one of the transmission ID information stored in the transmission ID storage part to transmit to the contents data receiver, when the transmitted transmission ID information is coincident with the receiver ID information assigned to the contents data receiver and a confirmation information indicating the coincidence to the contents data transmitter is received from the contents data receiver, the contents data transmitter transmits the key information, the encrypted contents data and the selection information to the contents data receiver.

10. The contents data transmitter according to claim 9, wherein the transmission ID information is transmitted through a plurality of signal route.

11. The contents data transmitter according to claim 7, wherein
    contents data is inputted continuously, and
    the key information selection part selects one among a plurality of the key information at a predetermined time interval.

12. The contents data transmitter according to claim 7, wherein
    the contents data transmitter transmits data divided in a plurality of data rows respectively through a plurality of the signal routes to the contents data receiver, and
    the data row includes data areas for the encrypted contents data and the selection information.

13. A contents data receiver receiving contents data from a contents data transmitter, comprising:
    a receiver transmission/reception part which receives a plurality of the key information for encryption, a contents data encrypted by using a key information selected from a plurality of the key information and a selection information regarding the key information used in the encryption of the contents data from the contents data transmitter through a plurality of signal routes each of which are connected to the contents data transmitter, wherein the key information, the encryrted contents data and the selection information are divided to be transmitted through the plurality of signal routes respectively;
    a key information storage part which stores a plurality of the received key information;
    a key information extraction part which extracts the key information used in the encryption of the contents data based on the selection information among a plurality of the key information stored in the key information storage part;
    a contents decryption part which decrypts the encrypted contents data by using the key information extracted by the key information extraction part; and
    an output part which outputs the contents data decrypted by the contents decryption part.

14. The contents data receiver according to claim 13, wherein the contents data receiver includes a reception ID storage part which stores a receiver ID information assigned to the contents data receiver,
    the contents data receiver receives one of transmission ID information assigned to respective contents data receivers from the contents data transmitter,
    the contents data receiver transmits, when the received transmission ID information is coincident with the receiver ID information stored in the reception ID storage, a confirmation information indicating the coincidence to the contents data transmitter, and
    the contents data receiver receives from the contents data transmitter received the confirmation information from the contents data receiver, the key information, the encrypted contents data and the selection information to the contents data receiver.

15. A contents data transmission/reception method for transmitting and receiving contents data between a contents data transmitter and a contents data receiver, including:
    generating a plurality of key information for encryption in the contents data transmitter and transmitting a plurality of the key information from the contents data transmitter to the contents data receiver;
    selecting one key information from a plurality of the generated key information in the contents data transmitter;
    encrypting a contents data by using the selected key information in the contents data transmitter;
    transmitting the encrypted contents data and a selection information regarding the selected key information from the contents data transmitter to the contents data receiver through a plurality of signal routes each of which are connected to the contents data transmitter, wherein the key information, the encrypted contents data and the selection information are divided to be transmitted through the plurality of signal routes respectively;
    extracting the key information used in the encryption of the contents data from a plurality of the key information in the contents data receiver;

decrypting the encrypted contents data in the contents data receiver; and outputting the decrypted contents data from the contents data receiver.

16. The contents data transmission/reception method according to claim 15, further including reproducing a contents data to be encrypted.

17. The contents data transmission/reception method according to claim 15, further including transmitting one of transmission ID information assigned to respective contents data receiver from the contents data transmitter to the contents data receiver through a plurality of signal routes; and transmitting, when the transmission ID information is coincident with a receiver ID information assigned to the contents data receiver, a confirmation information indicating the coincidence from the contents data receiver to the contents data transmitter.

18. The contents data transmission/reception method according to claim 15, wherein the method further includes transmitting a reception information indicating that the contents data receiver receives a plurality of the key information from the contents data receiver to the contents data transmitter through a plurality of signal routes, and when the reception information is received by the contents data transmitter, the one key information from a plurality of the key information is selected in the contents data transmitter.

19. The contents data transmission/reception method according to claim 15, wherein the contents data is inputted continuously, and one key information for encryption is selected from a plurality of the key information at a predetermined time interval.

* * * * *